United States Patent
Tanahashi

(10) Patent No.: US 12,395,713 B2
(45) Date of Patent: Aug. 19, 2025

(54) AUTHENTICATION SYSTEM AND AUTHENTICATION METHOD

(71) Applicant: PANASONIC INTELLECTUAL PROPERTY MANAGEMENT CO., LTD., Osaka (JP)

(72) Inventor: Satoru Tanahashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 155 days.

(21) Appl. No.: 18/221,203

(22) Filed: Jul. 12, 2023

(65) Prior Publication Data

US 2024/0022799 A1    Jan. 18, 2024

(30) Foreign Application Priority Data

Jul. 13, 2022 (JP) .................................. 2022-112427
Feb. 3, 2023 (JP) .................................. 2023-015557
Feb. 22, 2023 (JP) .................................. 2023-026296

(51) Int. Cl.
*H04N 23/56* (2023.01)
*G06V 40/16* (2022.01)
(Continued)

(52) U.S. Cl.
CPC ........... *H04N 23/11* (2023.01); *G06V 40/166* (2022.01); *G06V 40/60* (2022.01); *H04N 23/56* (2023.01); *H04N 23/90* (2023.01)

(58) Field of Classification Search
USPC ........................................................ 348/77
See application file for complete search history.

(56) References Cited

U.S. PATENT DOCUMENTS 10,878,222 B2 * 12/2020 Kase .................... G06V 40/171
11,080,516 B1 * 8/2021 Joshi ...................... G06V 40/19
(Continued)

FOREIGN PATENT DOCUMENTS

CN    207742680    8/2018
JP    2008-258830    10/2008
(Continued)

OTHER PUBLICATIONS

Extended European Search Report (EESR) from European Patent Office (EPO) in European Patent Appl. No. 23184770.8, dated Nov. 17, 2023.

(Continued)

*Primary Examiner* — Nigar Chowdhury
(74) *Attorney, Agent, or Firm* — Greenblum and Bernstein, P.L.C.

(57) ABSTRACT

An authentication system includes at least one illumination irradiating a person to be authenticated with invisible light, a first imaging device imaging the person to be authenticated irradiated with the invisible light, and an authentication device communicating with the first imaging device and executes authentication of the person to be authenticated based on a first invisible light image captured by the first imaging device. The illumination and the first imaging device are disposed at positions that are respectively asymmetric with respect to a line-of-sight position of the person to be authenticated guided by a line-of-sight guiding section that guides the line-of-sight position of the person to be authenticated.

14 Claims, 18 Drawing Sheets

(51) Int. Cl.
*G06V 40/60* (2022.01)
*H04N 23/11* (2023.01)
*H04N 23/90* (2023.01)

(56) References Cited

U.S. PATENT DOCUMENTS

| | | | |
|---|---|---|---|
| 11,876,557 B1* | 1/2024 | Venkataraman | G01S 7/487 |
| 12,085,734 B1* | 9/2024 | Maric | G02B 25/001 |
| 12,189,738 B2* | 1/2025 | Moreno | G06F 21/32 |
| 2014/0211071 A1* | 7/2014 | Pawlik | G07D 7/12 348/335 |
| 2016/0350607 A1* | 12/2016 | Sokeila | G06F 1/3231 |
| 2016/0379219 A1* | 12/2016 | Ariga | G06Q 20/20 705/44 |
| 2017/0325721 A1 | 11/2017 | Matsuda et al. | |
| 2018/0181795 A1 | 6/2018 | Nakano et al. | |
| 2018/0276465 A1* | 9/2018 | Lee | G06V 40/197 |
| 2019/0019025 A1 | 1/2019 | Yamazaki et al. | |
| 2019/0028659 A1* | 1/2019 | Kawata | H04N 1/4433 |
| 2019/0289950 A1* | 9/2019 | Matsumoto | G06Q 20/327 |
| 2019/0295351 A1* | 9/2019 | Goldstein | G06K 19/07749 |
| 2020/0114677 A1* | 4/2020 | Jones | B42D 25/36 |
| 2020/0218887 A1* | 7/2020 | He | G06V 40/171 |
| 2020/0342244 A1 | 10/2020 | Fancsali et al. | |
| 2021/0019540 A1 | 1/2021 | Nilsson | |
| 2021/0174105 A1* | 6/2021 | He | G06V 10/141 |
| 2021/0201000 A1* | 7/2021 | Huang | G06V 40/168 |
| 2021/0248782 A1* | 8/2021 | Chang | G06T 7/74 |
| 2021/0325678 A1* | 10/2021 | Maric | H04N 13/344 |
| 2022/0019769 A1 | 1/2022 | Kawase | |
| 2022/0057873 A1* | 2/2022 | Kubota | H10K 59/65 |
| 2022/0070236 A1* | 3/2022 | Yerli | H04L 63/0861 |
| 2022/0180614 A1* | 6/2022 | Staton | G04G 21/025 |
| 2022/0191374 A1* | 6/2022 | Kowdle | G06V 40/166 |
| 2022/0281258 A1* | 9/2022 | Wu | B42D 25/309 |
| 2022/0326526 A1* | 10/2022 | Kamo | G02B 27/0179 |
| 2023/0005299 A1* | 1/2023 | Hayasaka | G06V 40/161 |
| 2024/0045101 A1* | 2/2024 | Guest | G02B 27/0093 |
| 2024/0078846 A1* | 3/2024 | Chyn | G06V 40/165 |

FOREIGN PATENT DOCUMENTS

| | | |
|---|---|---|
| JP | 2012-164357 | 8/2012 |
| JP | 2017-219576 | 12/2017 |
| JP | 2018-106720 | 7/2018 |
| JP | 2019-020991 | 2/2019 |
| JP | 2020-072119 | 5/2020 |
| JP | 2021-501401 | 1/2021 |
| WO | 2016/084214 | 6/2016 |
| WO | 2020/115890 | 6/2020 |

OTHER PUBLICATIONS

Abd Aziz, "Effects of Visible and Near Infrared Polarized Lights on Spoofing Face Detection", Journal of Computer Science, vol. 15, No. 2, Feb. 28, 2019, pp. 288-301.

Hu et al., "Overview of Polarimetric Thermal Imaging for Biometrics", Proceedings of SPIE; Proceedings of SPIE ISSN 0277-786X vol. 10524, SPIE, US, vol. 10655, May 14, 2018, pp. 1065502-1065502.

Pan et al., "Part-based Face Recognition Using Near Infrared Images", Computer Vision and Pattern Recognition, 2007. CVPR '07. IEEE Conference on, Jun. 30, 2007, pp. 1-6.

Theofanos et al., NIST IR 7540 "Assessing Face Acquisition", NIST, National Institute of Standards and Technology (NIST), Dec. 31, 2008, pp. 1-39, URL:https://nvlpubs.nist.gov/nistpubs/Legacy/IR/nistir7540.pdf.

* cited by examiner

AUTHENTICATION SYSTEM AND AUTHENTICATION METHOD

CROSS-REFERENCE TO RELATED APPLICATIONS

This application is based on and claims priority under 35 USC 119 from Japanese Patent Applications No. 2022-112427 filed on Jul. 13, 2022, No. 2023-015557 filed on Feb. 3, 2023, and No. 2023-026296 filed on Feb. 22, 2023 the contents of which are incorporated herein by reference.

TECHNICAL FIELD

The present disclosure relates to an authentication system and an authentication method.

BACKGROUND ART

JP2021-501401A discloses a device for biometric authentication of objects. The device includes an optical image sensor element that is sensitive to an infrared spectrum with a peak wavelength between 925 nm and 955 nm so as to capture at least one photograph of an object under ambient light conditions with additional infrared conditions, an infrared light source that provides additional infrared light, and a processing unit that provides an image or image code for biometric authentication obtained from the photograph. The device subtracts a solar photograph from the captured infrared photograph to obtain an image or image code for biometric authentication.

SUMMARY OF INVENTION

In recent years, the use of biometric authentication using a photograph (face image) of a person's face has been increasing in various places indoors and outdoors. However, when taking a photograph in an environment where a person's face is irradiated by sunlight or illumination light, or in an environment where the person's face is backlit, at night, or in rainy weather or in other low-illuminance environments, the device could not pick up the features of the face of the person used for biometric authentication because the face of the person appearing in the photograph is in a white flying state, a backlit state, and the like.

Further, in recent years, there has been a demand for a device capable of realizing biometric authentication using a photograph taken while a person is wearing a mask. In biometric authentication using such a photograph, an eye feature quantity is important because the feature quantity required for biometric authentication is reduced. However, when specular reflection occurs in which light (sunlight, illumination light, and the like) is reflected on glasses, since light (sunlight, illumination light, and the like) is reflected on the glasses, there was a difficulty when the device calculates the feature quantity of the eye required for biometric authentication.

The present disclosure has been devised in view of the conventional circumstances described above, and aims to provide an authentication system and an authentication method capable of obtaining a face image more suitable for biometric authentication by suppressing reflection of illumination light due to specular reflection.

The present disclosure provides an authentication system including at least one illumination that irradiates a person to be authenticated with invisible light; a first imaging device that images the person to be authenticated irradiated with the invisible light; and an authentication device that is capable of communicating with the first imaging device and executes authentication of the person to be authenticated based on a first invisible light image captured by the first imaging device. The illumination and the first imaging device are disposed at positions that are respectively asymmetric with respect to a line-of-sight position of the person to be authenticated guided by a line-of-sight guiding section that guides the line-of-sight position of the person to be authenticated.

Further, the present disclosure provides an authentication method performed by an authentication system including at least one illumination that emits invisible light, a first imaging device that images a person to be authenticated, and an authentication device that is capable of communicating with the first imaging device and executes authentication of the person to be authenticated. The illumination and the first imaging device are disposed at positions that are respectively asymmetric with respect to a line-of-sight position of the person to be authenticated guided by a line-of-sight guiding section that guides the line-of-sight position of the person to be authenticated. The authentication method includes imaging, by the first imaging device, the person to be authenticated irradiated with the invisible light; and authenticating, by the authentication device, the person to be authenticated based on the captured first invisible light image.

According to the present disclosure, it is possible to obtain a face image more suitable for biometric authentication by suppressing reflection of illumination light due to specular reflection.

DESCRIPTION OF EMBODIMENTS

Hereinafter, embodiments specifically disclosing the configuration and operation of an authentication system and an authentication method according to the present disclosure will be described in detail with reference to drawings as appropriate. However, a detailed description more than necessary may be omitted. For example, a detailed description of a well-known content or a repeated description of the substantially same configuration will be omitted. This is to prevent the following description from being unnecessarily redundant and to facilitate understanding of a person skilled in the art. The accompanying drawings and the following description are provided for those skilled in the art to fully understand the present disclosure, and are not intended to limit the subject matter described in the claims.

Embodiment 1

Figure 1:
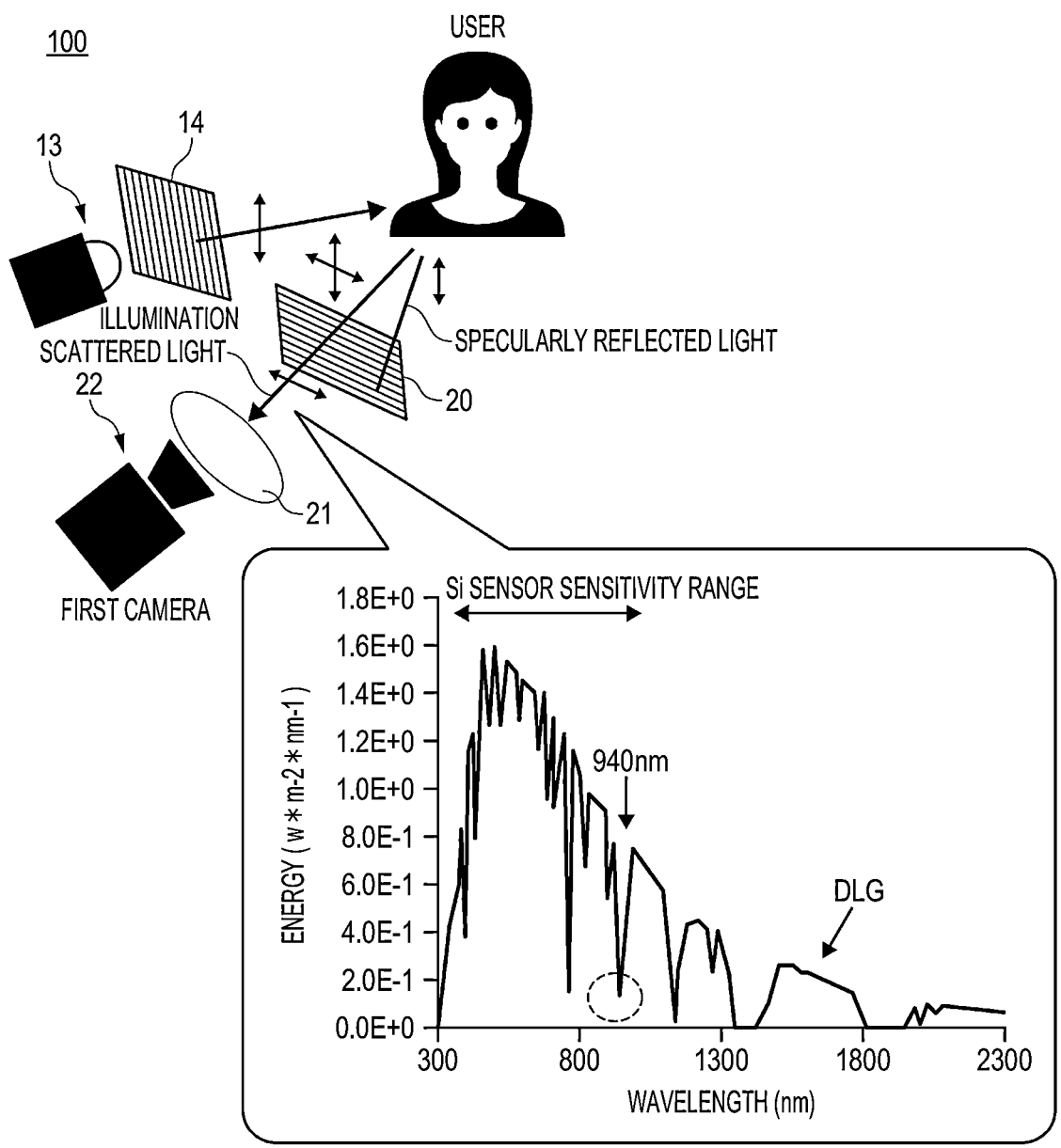
FIG. 1 is a diagram illustrating a use case of a biometric authentication system according to Embodiment 1.
Figure 2:
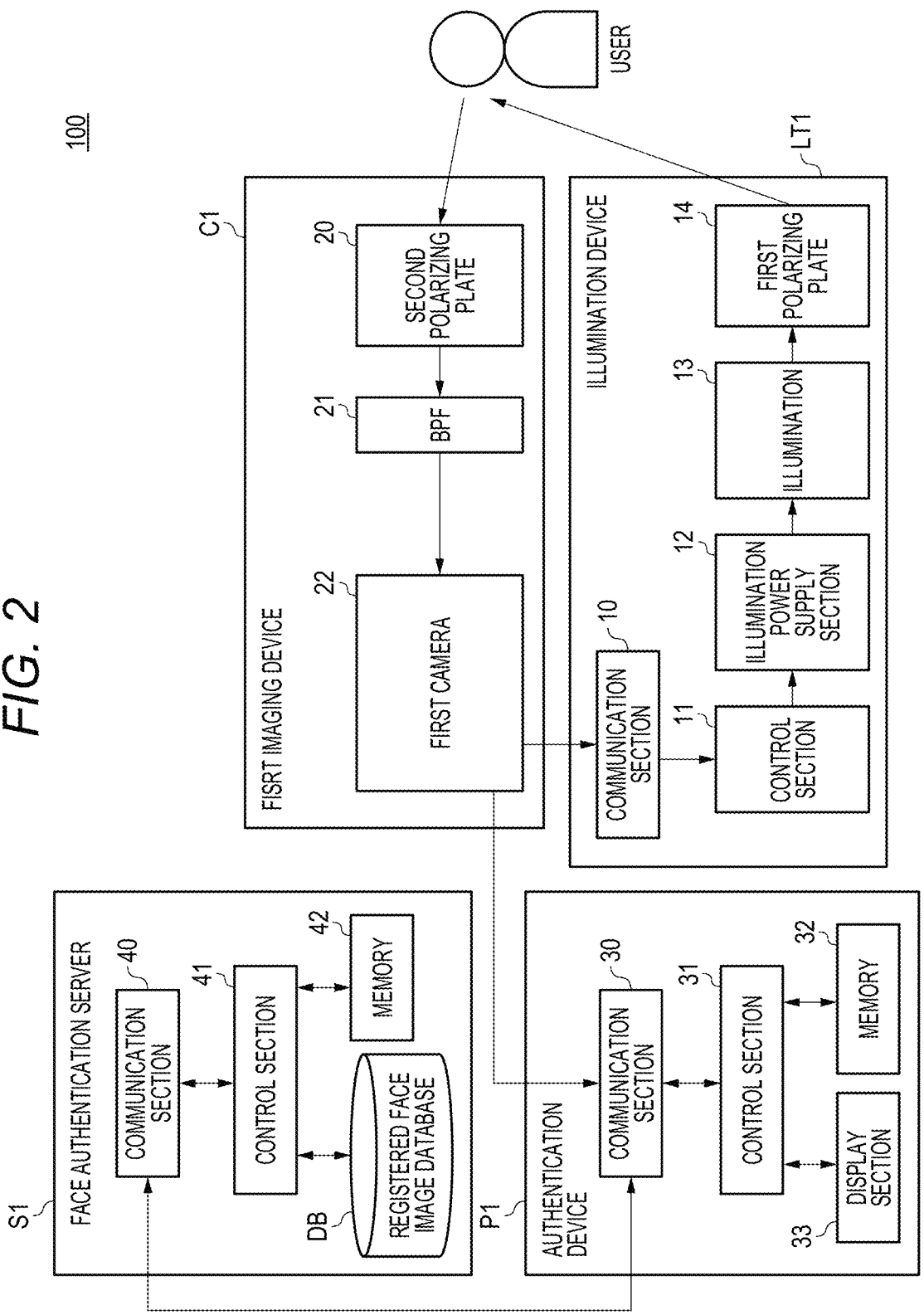
FIG. 2 is a block diagram illustrating an example of an internal configuration of the biometric authentication system according to Embodiment 1.

A biometric authentication system 100 according to Embodiment 1 will be described with reference to FIG. 1. FIG. 1 is a diagram illustrating a use case of the biometric authentication system 100 according to Embodiment 1. FIG. 2 is a block diagram illustrating an example of an internal configuration of the biometric authentication system 100 according to Embodiment 1.

In FIG. 1, to make it easy to understand the description of invisible light illumination emitted by an illumination 13 and internally scattered light received and incident on a first camera 22 by being reflected by the inside the face of a user (skin), the drawing of an authentication device P1 and a face authentication server S1 is omitted.

The biometric authentication system 100 as an example of an authentication system includes an illumination device LT1, a first imaging device C1, the authentication device P1, and the face authentication server S1. The biometric authentication system 100 shown in FIG. 2 is an example and is not limited thereto. For example, the biometric authentication system 100 may include a network. The authentication device P1 and the face authentication server S1 may be connected so as to be able to transmit and receive data via a network. Also, a registered face image database DB may be configured separately from the face authentication server S1.

The illumination device LT1 irradiates a user who is a biometric authentication target with invisible light including near-infrared light with a wavelength of 940 nm. The illumination device LT1 includes a communication section 10, a control section 11, an illumination power supply section 12, the illumination 13, and a first polarizing plate 14.

The communication section 10 is connected with the first camera 22 of the first imaging device C1 in a data-communicable manner and outputs a control command transmitted from the first camera 22 to the control section 11.

Based on the control command output from the communication section 10, the control section 11 performs ON/OFF control of the illumination power supply section 12 (that is, control of turning on/off the illumination 13).

The illumination power supply section 12 is controlled by the control section 11 to turn ON/OFF the power supply to the illumination 13.

The illumination 13 is implemented by at least one light-emitting diode (LED). The illumination 13 is supplied with power from the illumination power supply section 12 and emits invisible light, which is near-infrared light with a wavelength of 940 nm. The illumination 13 may be a point light source or a surface light source.

A first polarizing plate 14 is disposed perpendicular to a second polarizing plate 20 (that is, crossed Nicols) to polarize the invisible light emitted from the illumination 13 in a first direction. For example, in the example shown in FIG. 1, the first polarizing plate 14 transmits only the vertical component of the invisible light of the illumination 13.

The first imaging device C1 images a region including the face of the user and acquires a first captured image of the user (an example of a first invisible light image) used for biometric authentication. The first imaging device C1 includes the second polarizing plate 20, a band-pass filter (BPF) 21, and the first camera 22.

The second polarizing plate 20 is disposed perpendicular to the first polarizing plate 14 (for example, crossed Nicols) so that components in the first direction (that is, components of specularly reflected light) out of the specularly reflected light and the internally scattered light reflected by the face of the user and the other light (sunlight, illumination light which is visible light, and the like) are removed, and only the components in the second direction out of the internally scattered light and the other light is transmitted.

The BPF 21 transmits only invisible light (that is, near-infrared light with a wavelength of 940 nm) out of the internally scattered light and other light transmitted through the second polarizing plate 20. As a result, the BPF 21 can transmit only the invisible light with a wavelength of 940 nm, which is within a sensor sensitivity range within which the Si photodiode (not shown) of the first camera 22 can receive light, and having a large attenuation of sunlight by moisture contained in the air.

The first camera 22 includes at least an image sensor (not shown) and a lens (not shown). The image sensor is a solid-state imaging device including a Si photodiode and, for example, a charged-coupled device (CCD) or a complementary metal oxide semiconductor (CMOS), and converts an optical image by invisible light (internally scattered light) imaged on the imaging surface into an electric signal. The first camera 22 transmits the converted electric signal (data of the first captured image) to the authentication device P1.

The authentication device P1 is implemented by, for example, a personal computer (PC), a laptop PC, a tablet terminal, a smartphone, or the like, and executes authentication of a user who is a biometric authentication target. The authentication device P1 includes a communication section 30, a control section 31, a memory 32, and a display section 33.

The communication section 30 is connected to the first camera 22 of the first imaging device C1 and the communication section 40 of the face authentication server S1 in a wireless or wired communicable manner, and transmits and receives data. The communication section 30 acquires data of the first captured image transmitted from the first camera 22 and outputs the data to the control section 31.

The communication section 30 transmits the face image output from the control section 31 to the face authentication server S1. Also, the communication section 30 acquires an authentication score corresponding to the face image transmitted from the face authentication server S1 and outputs the authentication score to the control section 31.

Although not shown in FIG. 2, the communication section 30 may transmit the control command (for example, a control command for starting imaging by the first camera 22 of the first imaging device C1, and the like) generated by the control section 31 to the first camera 22. Based on the control command transmitted from the communication section 30, the first camera 22 may start exposure (imaging), generate a control command for turning on the illumination 13 of the illumination device LT1, and transmit the control command to the communication section 10.

The control section 31 is configured by using, for example, a central processing unit (CPU) or a field programmable gate array (FPGA), and cooperates with the memory 32 to perform various types of processing and control. Specifically, the control section 31 refers to the program and data stored in the memory 32 and executes the program, thereby implementing the function of the authentication device P1.

The control section 31 executes image analysis processing on the first captured image captured by the first camera 22 to detect the face of the user appearing in the first captured image. The control section 31 cuts out a region including the detected face of the user from the first captured image to generate a face image. The control section 31 outputs the generated face image to the communication section 30 and transmits the face image to the face authentication server S1.

Based on the positional information of the detected face of the user, the control section 31 generates a frame (frame FB shown in FIG. 10) indicating the position of the face of the user, and superimposes the frame on the first captured image. The control section 31 outputs the frame-superimposed first captured image to the display section 33 for display.

Further, based on whether or not the authentication score transmitted from the face authentication server S1 is equal to or greater than a threshold value, the control section 31 determines whether the user appearing in the face image (first captured image) is a registered user registered in advance in the registered face image database DB.

When it is determined that the authentication score is equal to or greater than the threshold value, the control section 31 determines that the user is a registered user registered in advance in the registered face image database DB and that the biometric authentication is "OK" (that is, success). The control section 31 executes a predetermined authentication success operation set in advance (an example of a predetermined operation).

The authentication success operation referred to here is an operation (control) set in advance by the user, administrator, or the like of the biometric authentication system 100 based on the application of the biometric authentication system 100. Authentication success operations include, for example, operations for unlocking and opening doors, entrance gates, and the like, settlement operations for purchasing goods, and operations for generating and displaying an authentication result screen for notifying that biometric authentication results are successful.

On the other hand, when it is determined that the authentication score is not equal to or greater than the threshold value, the control section 31 determines that the user is not a registered user registered in advance in the registered face image database DB and that the biometric authentication is "NG" (that is, failure). The control section 31 generates an authentication failure screen (not shown) for notifying the user of biometric authentication failure, and outputs the screen to the display section 33.

The memory 32 includes, for example, a random access memory (RAM) as a work memory used when executing each processing of the control section 31, and a read only memory (ROM) for storing programs and data defining the operation of the control section 31. Data or information generated or acquired by the control section 31 is temporarily stored in the RAM. A program that defines the operation of the control section 31 is written in the ROM.

The display section 33, which is an example of a monitor, may be configured by using a display device such as a liquid crystal display (LCD) or an organic electroluminescence (EL). The display section 33 displays (outputs) the authentication failure screen output from the control section 31, and displays (outputs) the first captured image on which the frame FB is superimposed.

The face authentication server S1 calculates an authentication score indicating the probability that the user appearing in the first captured image transmitted from the authentication device P1 is one of the users registered in advance in the registered face image database DB. The face authentication server S1 includes the communication section 40, the control section 41, the memory 42, and the registered face image database DB. The registered face image database DB may be configured separately and may be communicably connected to the face authentication server S1.

The communication section 40 is connected to the authentication device P1 in a wireless or wired communicable manner, and transmits and receives data. The communication section 40 acquires data of the face image (first captured image) transmitted from the authentication device P1 and outputs the data to the control section 41. The communication section 40 transmits the authentication score information output from the control section 41 to the authentication device P1.

The control section 41 is configured by using, for example, a CPU or FPGA, and cooperates with the memory 42 to perform various types of processing and control. Specifically, the control section 41 refers to the program and data stored in the memory 42 and executes the program, thereby implementing the function of the face authentication server S1.

The control section 41 collates the acquired face image with the registered face image of each of a plurality of users registered in advance in the registered face image database DB to calculate (evaluate) an authentication score which is an index of whether a user appearing in the face image and a registered user are the same person or not. The control section 41 outputs information on the calculated authentication score to the communication section 40 and transmits the information to the authentication device P1.

The memory 42 includes, for example, a RAM as a work memory used when executing each processing of the control section 41 and a ROM for storing programs and data defining the operation of the control section 41. Data or information generated or acquired by the control section 41 is temporarily stored in the RAM. A program that defines the operation of the control section 41 is written in the ROM.

The registered face image database DB is a so-called storage, and is configured by using a storage medium such as a flash memory, hard disk drive (HDD), solid state drive (SSD), or the like. The registered face image database DB stores (registers) a registered face image for each user and information about the user (for example, the user's name, date of birth, age, gender, address, telephone number, ID, and the like) in association with each other.

Figure 3:
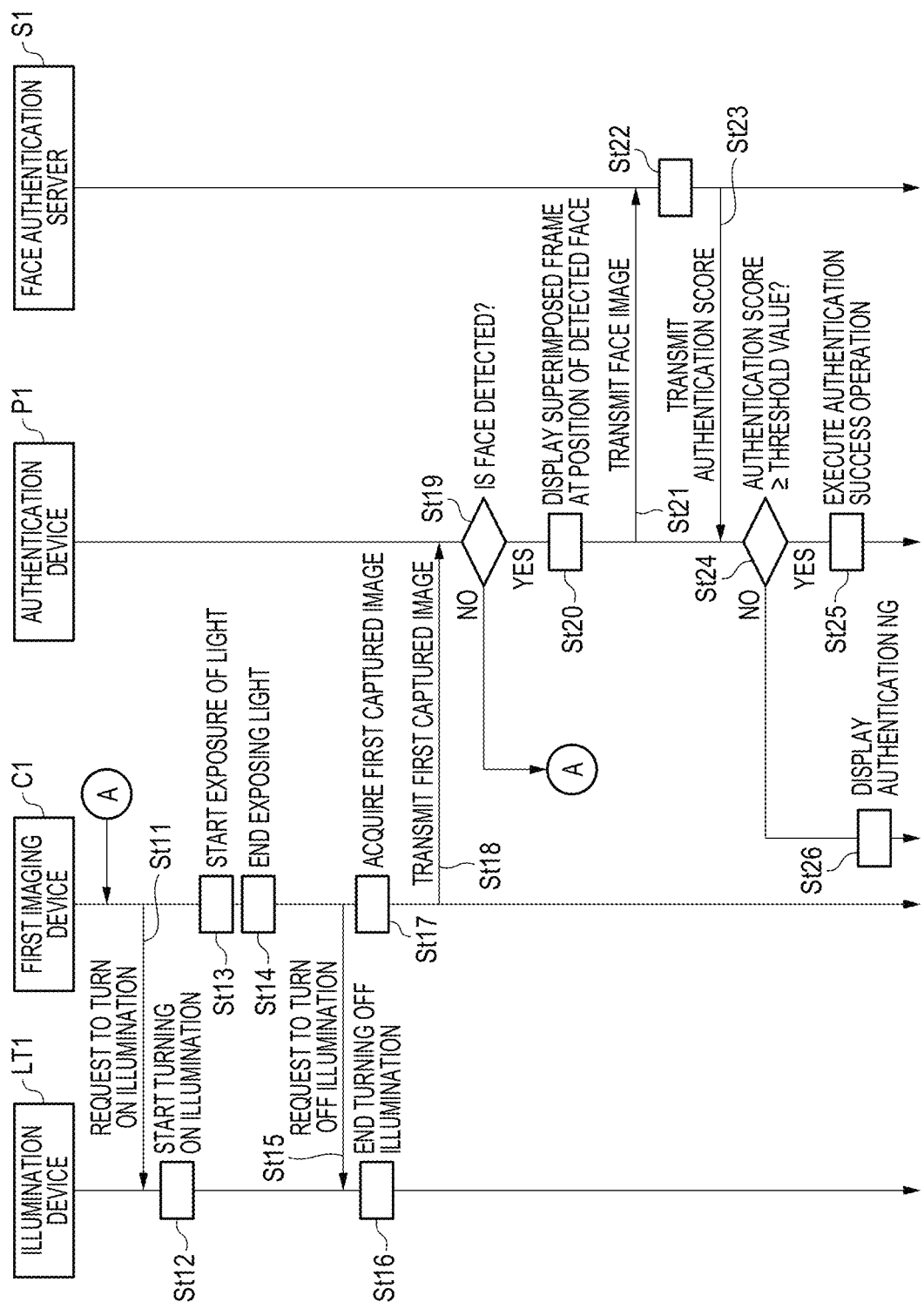
FIG. 3 is a sequence diagram illustrating an example of an operation procedure of the biometric authentication system according to Embodiment 1.

Next, biometric authentication operations performed by the biometric authentication system 100 will be described with reference to FIG. 3. FIG. 3 is a sequence diagram illustrating an example of an operation procedure of the biometric authentication system 100 according to Embodiment 1.

The order in which the processing of steps St11 to St16 are executed may not be the order shown in FIG. 3. For example, the processing of steps St11 and St12 may be executed after the processing of step St13, or the processing of step St14 may be executed after the processing of step St16.

The first imaging device C1 generates a control command for turning on the illumination 13 at the same time as starting imaging, and transmits the generated control command to the illumination device LT1 to request to turn on the illumination 13 (St11). When the illumination device LT1 acquires the control command transmitted from the first imaging device C1, the illumination power supply section 12 starts supplying power to the illumination 13 to turn on the illumination 13 (St12).

The first imaging device C1 starts exposure of the first camera 22 (St13), and ends the exposure after a predetermined exposure time has elapsed (St14). After completing the exposure (imaging), the first imaging device C1 generates a control command for turning off the illumination 13, and transmits the generated control command to the illumination device LT1 to request to turn off the illumination 13 (St15).

When the illumination device LT1 acquires the control command transmitted from the first imaging device C1, the illumination device LT1 ends supplying power to the illumination 13 by the illumination power supply section 12 to turn off the illumination 13 (St16).

The first imaging device C1 acquires the captured first captured image (St17), and transmits the data of the first captured image to the authentication device P1 (St18).

The authentication device P1 executes image analysis processing on the first captured image transmitted from the first imaging device C1 to detect the face of the user. The authentication device P1 determines whether or not the user's face is detected from the first captured image (St19).

When it is determined in the processing of step St19 that the face of the user has been detected from the first captured image (St19, YES), the authentication device P1 generates a first captured image obtained by superimposing a frame (for example, a frame FB shown in FIG. 10) surrounding the position (region) of the face detected in the first captured image and outputs (displays) the first captured image to the display section 33 (St20). Further, the authentication device P1 generates a face image obtained by cutting out the detected region of the face of the user from the first captured image, and transmits the face image to the face authentication server S1 (St21).

On the other hand, when it is determined in the processing of step St19 that the user's face is not detected from the first captured image (St19, NO), the authentication device P1 returns to the processing of step St11. Here, the authentication device P1 may generate a control command for requesting to re-image the user, and transmit the control command to the first imaging device C1.

The face authentication server S1 collates the user's face image transmitted from the authentication device P1 with the registered face image of each of the plurality of users registered in the registered face image database DB to calculate an authentication score (St22). The face authentication server S1 transmits information on the calculated authentication score to the authentication device P1 (St23).

The authentication device P1 acquires the authentication score transmitted from the face authentication server S1 to determine whether or not the authentication score is equal to or greater than the threshold value (St24).

When it is determined in the processing of step St24 that the authentication score transmitted from the face authentication server S1 is equal to or greater than the threshold value (St24, YES), the authentication device P1 determines that the user is a registered user registered in advance in the registered face image database DB and that the biometric authentication is "OK" (that is, success), and executes a predetermined authentication success operation set in advance (St25).

On the other hand, when it is determined in the processing of step St24 that the authentication score is not equal to or greater than the threshold value (St24, NO), the authentication device P1 determines that the user is not a registered user registered in advance in the registered face image database DB and that the biometric authentication is "NG" (that is, failure). The authentication device P1 generates an authentication failure screen (not shown) for notifying the user of biometric authentication failure, and outputs (displays) the screen on the display section 33 (St26).

As described above, the biometric authentication system 100 removes light which is specularly reflected by the second polarizing plate 20 disposed in a crossed-Nicols state (for example, sunlight, illumination light which is visible light, and the like) out of the light incident on the first camera 22, thereby realizing the imaging of the user by the invisible light emitted by the illumination 13 (near-infrared light with a wavelength of 940 nm).

Specifically, the second polarizing plate 20 can remove the components in the first direction out of the light of the illumination 13 which is specularly reflected by the user's glasses (light polarized in the first direction), other light (for example, sunlight, illumination light which is visible light, and the like), or other light which is emitted at a Bluster angle and is specularly reflected by the user's glasses (visible light in the first direction).

As a result, even in an imaging environment where a user is imaged or an environment of the installation environment where the first camera 22 is installed is not suitable for imaging of the first captured image used for biometric authentication (for example, an environment where specular reflection is generated, a low-illuminance environment, and the like), by removing components in the first direction, the biometric authentication system 100 can acquire the first captured image (that is, the first captured image suitable for biometric authentication) from which features necessary for biometric authentication can be extracted.

In addition, even when imaging a user whose face is partially hidden by a mask or the like, the biometric authentication system 100 can acquire the first captured image from which a feature quantity (for example, a feature quantity related to an iris) related to the eyes of the user used for biometric authentication can be calculated from the captured first captured image.

Embodiment 2

The above-described biometric authentication system 100 according to Embodiment 1 shows an example in which one first imaging device C1 (first camera 22) captures the first captured image used for biometric authentication. The first captured image captured by the first camera 22 is captured when invisible light illumination (wavelength of 940 nm) emitted to the user is scattered inside the skin of the user and the scattered internally scattered light is received by an image sensor. Therefore, the first captured image becomes a captured image in which the user's blood vessels, whiskers, and the like are reflected. As a result, the user appearing in the first captured image displayed on the display section 33 may differ from the actual appearance of the user.

Therefore, the biometric authentication system 200 according to Embodiment 2 describes an example of imaging a user by each of two imaging devices (first imaging device C21 and second imaging device C22), and capturing a first captured image used for biometric authentication and a second captured image displayed on the display section 33 to be presented to the user.

In the following description, the same symbols are assigned to the same configurations as those of the devices constituting the biometric authentication system 100 according to Embodiment 1, and the description thereof will be omitted.

Figure 4:
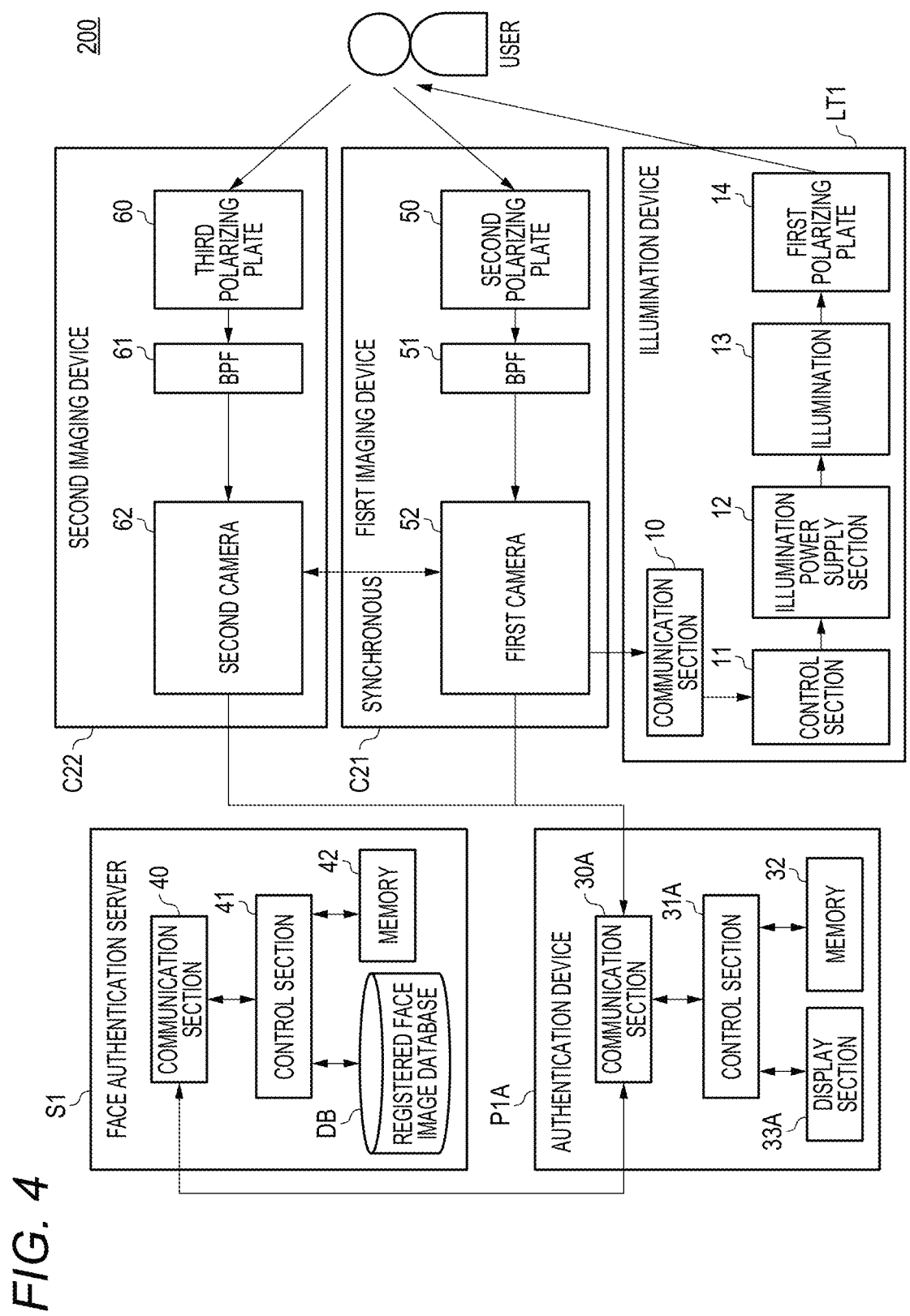
FIG. 4 is a block diagram illustrating an example of an internal configuration of a biometric authentication system according to Embodiment 2.

The biometric authentication system 200 according to Embodiment 2 will be described with reference to FIG. 4. FIG. 4 is a block diagram illustrating an example of an internal configuration of the biometric authentication system 200 according to Embodiment 2.

The biometric authentication system 200 includes an illumination device LT1, two imaging devices (a first imaging device C21 and a second imaging device C22), an authentication device P1A, and a face authentication server S1.

The first imaging device C21 images a region including a user's face and acquires a first captured image used for biometric authentication. The first imaging device C21 includes a second polarizing plate 50, a BPF 51, and a first camera 52.

The second polarizing plate 50 is disposed perpendicular to the first polarizing plate 14 (for example, crossed Nicols) so that components in the first direction (that is, components of specularly reflected light) out of the specularly reflected light and the internally scattered light reflected by the user's face and the other light (sunlight, illumination light which is visible light, and the like) are removed, and only the components in the second direction out of the internally scattered light and the other light is transmitted.

The BPF 51 transmits only invisible light (that is, near-infrared light with a wavelength of 940 nm) out of the internally scattered light and other light transmitted through the second polarizing plate 50. As a result, the BPF 51 can transmit only the invisible light with a wavelength of 940 nm, which is within a sensor sensitivity range within which the Si photodiode (not shown) of the first camera 22 can receive light, and having a large attenuation of sunlight by moisture contained in the air.

The first camera 52 includes at least an image sensor (not shown) and a lens (not shown). The image sensor is a solid-state imaging device including a Si photodiode and, for example, a CCD or CMOS, and converts an optical image of invisible light (internally scattered light) formed on an imaging surface into an electric signal. The first camera 52 executes synchronous control with the second camera 62 of the second imaging device C22. The first camera 52 transmits the converted electric signal (data of the first captured image) to the authentication device P1A.

The second imaging device C22 images a region including the user's face and acquires a second captured image to be displayed on the display section 33A. The second imaging device C22 includes a third polarizing plate 60, a BPF 61, and a second camera 62.

The third polarizing plate 60 is disposed parallel to the first polarizing plate 14 (that is, parallel Nicols), and transmits only the surface-reflected light that is reflected by the surface of the user's face.

The BPF 61 as an example of a filter transmits only invisible light (that is, near-infrared light with a wavelength of 940 nm) out of the surface-reflected light transmitted through the third polarizing plate 60. As a result, the BPF 61 can transmit only the invisible light with a wavelength of 940 nm, which is within a sensor sensitivity range within which the Si photodiode (not shown) of the second camera 62 can receive light, and having a large attenuation of sunlight by moisture contained in the air.

The second camera 62 includes at least an image sensor (not shown) and a lens (not shown). The image sensor is a solid-state imaging device including a Si photodiode and, for example, a CCD or CMOS, and converts an optical image of invisible light (surface-reflected light) formed on an imaging surface into an electric signal. The second camera 62 executes synchronous control with the first camera 52 of the first imaging device C21. The second camera 62 transmits the converted electric signal (data of the second captured image) to the authentication device P1A.

The authentication device P1A is implemented by, for example, a PC, a laptop PC, a tablet terminal, a smartphone, or the like, and executes authentication of a user who is a biometric authentication target, and displays a second captured image captured by the second camera 62. The authentication device P1A includes a communication section 30A, a control section 31A, a memory 32, and a display section 33A.

The communication section 30A is connected to the first camera 52 of the first imaging device C21, the second camera 62 of the second imaging device C22, and the communication section 40 of the face authentication server S1 in a wireless or wired communicable manner, and transmits and receives data.

The communication section 30A acquires the data of the first captured image transmitted from the first camera 52 and the data of the second captured image transmitted from the second camera 62, and outputs the data to the control section 31A. The communication section 30A also transmits the user's face image generated by the control section 31A to the face authentication server S1. The communication section 30A acquires an authentication score corresponding to the face image transmitted from the face authentication server S1 and outputs the authentication score to the control section 31A.

The control section 31A is configured by using, for example, a CPU or FPGA, and cooperates with the memory 32 to perform various types of processing and control. Specifically, the control section 31A refers to the program and data stored in the memory 32 and executes the program, thereby implementing the function of the authentication device NA.

The control section 31A executes image analysis processing on the first captured image transmitted from the first camera 52, and detects the face of the user appearing in the first captured image. The control section 31A cuts out a region including the detected face of the user from the first captured image to generate a face image. The control section 31A outputs the generated face image to the communication section 30A and transmits the face image to the face authentication server S1.

In addition, based on the positional information of the disposed first camera 52 and second camera 62, the control section 31A converts the positional information of the face of the user on the first captured image into the positional information on the second captured image transmitted from the second camera 62. Based on the converted positional information, the control section 31A generates a frame (frame FB shown in FIG. 10) indicating the region including the face position of the user, and superimposes the frame on the second captured image. The control section 31A outputs the frame-superimposed second captured image to the display section 33A for display.

Based on whether or not the authentication score transmitted from the face authentication server S1 is equal to or greater than a threshold value, the control section 31A determines whether the user appearing in the face image (first captured image) is a registered user registered in advance in the registered face image database DB.

The display section 33A, which is an example of a monitor, may be configured by using a display device such as LCD or organic EL. The display section 33A displays (outputs) the second captured image after superimposing the frame FB output from the control section 31A, displays (outputs) an authentication failure screen, and/or the like. As described above, the biometric authentication system 200 according to Embodiment 2 and illuminate the user with the invisible light (near-infrared light with a wavelength of 940 nm) of the illumination 13 to capture the second captured image based on the surface-reflected light that is reflected on the surface of the skin of the user. In addition, since the first polarizing plate 14 and the third polarizing plate 60 are in a parallel-Ni cols state, the surface-reflected light received by the second camera 62 becomes invisible light with a wavelength of 940 nm including near-infrared light emitted to the user through the first polarizing plate 14 and other light illuminating the user (sunlight, illumination light of visible light indoors and outdoors, or the like). As a result, the biometric authentication system 200 according to Embodiment 2 is suitable for biometric authentication and can realize acquisition of the first captured image captured by receiving scattered light and display of the second captured image captured by receiving surface-reflected light.

Modification Example 1 of Embodiment 2

The biometric authentication system 200 according to Embodiment 2 has shown an example in which the second imaging device C22 including the third polarizing plate 60 captures the second captured image to be displayed on the display section 33A. A biometric authentication system 200A according to Modification Example 1 of Embodiment 2 describes an example of capturing a second captured image by the second imaging device C22A in a configuration where the third polarizing plate 60 is omitted.

In the following description, the same symbols are assigned to the same configurations as those of the devices constituting the biometric authentication system 200 according to Embodiment 2, and the description thereof will be omitted.

Figure 5:
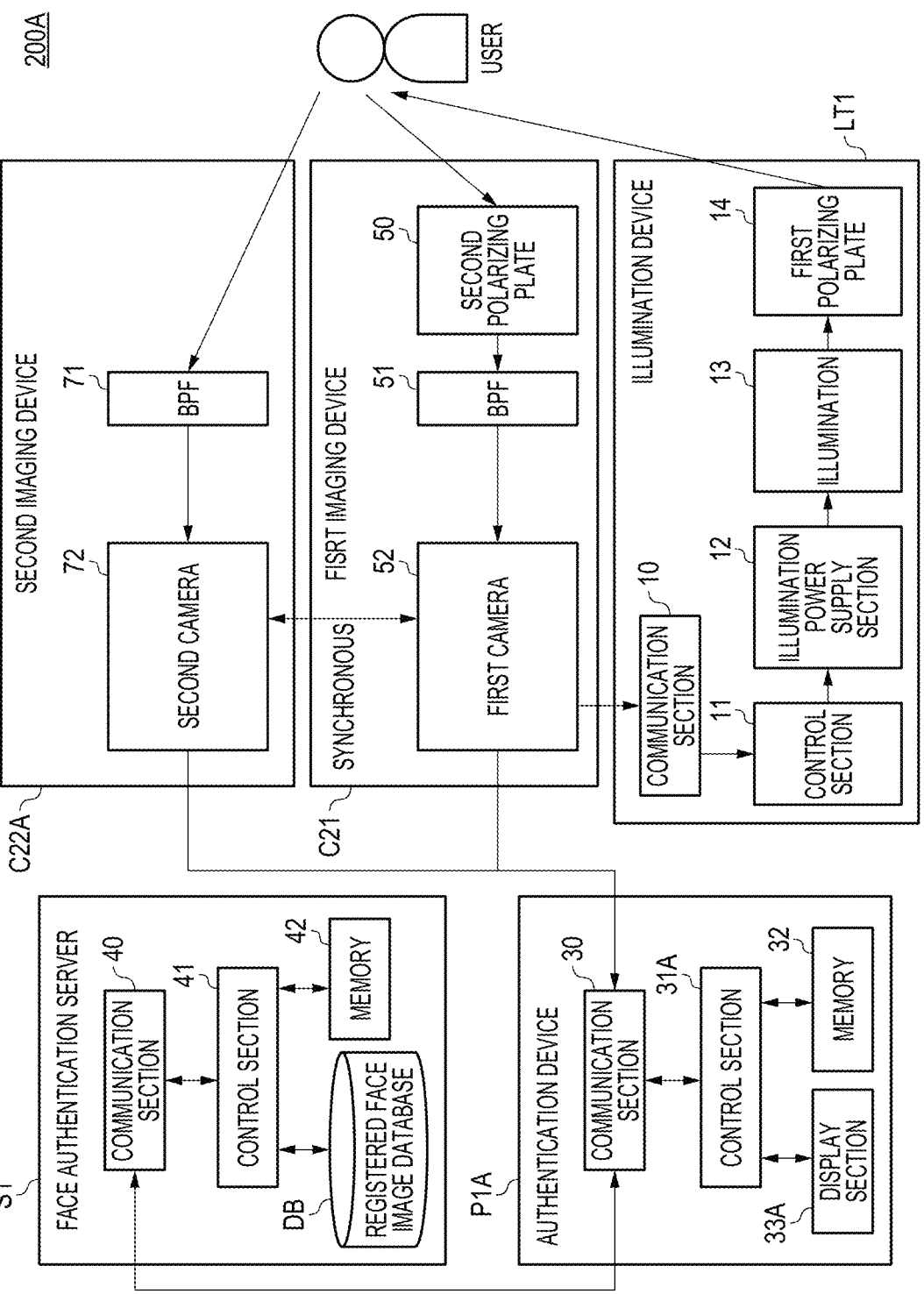
FIG. 5 is a block diagram illustrating an example of an internal configuration of a biometric authentication system according to Modification Example 1 of Embodiment 2.

The biometric authentication system 200A according to Modification Example 1 of Embodiment 2 will be described with reference to FIG. 5. FIG. 5 is a block diagram illustrating an example of an internal configuration of the biometric authentication system 200A according to Modification Example 1 of Embodiment 2.

The second imaging device C22A images a region including the face of the user and acquires a second captured image to be displayed on the display section 33A. The second imaging device C22A includes a BPF 71 and a second camera 72.

The BPF 71 as an example of a filter transmits only invisible light (that is, near-infrared light with a wavelength of 940 nm) out of the surface-reflected light that is emitted to the user to be reflected. As a result, the BPF 71 can transmit only the invisible light with a wavelength of 940 nm, which is within a sensor sensitivity range within which the Si photodiode (not shown) of the second camera 72 can receive light, and having a large attenuation of sunlight by moisture contained in the air.

The second camera 72 includes at least an image sensor (not shown) and a lens (not shown). The image sensor is a solid-state imaging device including a Si photodiode and, for example, a CCD or CMOS, and converts an optical image of invisible light (surface-reflected light) formed on an imaging surface into an electric signal. The second camera 72 executes synchronous control with the first camera 52 of the first imaging device C21. The second camera 72 transmits the converted electric signal (data of the second captured image) to the authentication device P1A.

As described above, the biometric authentication system 200A according to Modification Example 1 of Embodiment 2 can illuminate the user with the invisible light (near-infrared light with a wavelength of 940 nm) of the illumination 13 and capture the second captured image based on the surface-reflected light that is reflected on the surface of the skin of the user. The surface-reflected light received by the second camera 62 becomes invisible light with a wavelength of 940 nm out of the light including near-infrared light emitted to the user through the first polarizing plate 14 and other light illuminating the user (sunlight, illumination light of visible light indoors and outdoors, or the like). As a result, the biometric authentication system 200A according to Modification Example 1 of Embodiment 2 is suitable for biometric authentication and can realize acquisition of the first captured image captured by receiving scattered light and display of the second captured image captured by receiving surface-reflected light.

Modification Example 2 of Embodiment 2

The biometric authentication system 200 according to Embodiment 2 has shown an example in which the second imaging device C22 including the third polarizing plate 60 and the BPF 61 captures the second captured image to be displayed on the display section 33A. A biometric authentication system 200B according to Modification Example 2 of Embodiment 2 describes an example of capturing a second captured image by a second imaging device C22B in a configuration where the third polarizing plate 60 and the BPF 61 are omitted.

In the following description, the same symbols are assigned to the same configurations as those of the devices constituting the biometric authentication system 200 according to Embodiment 2, and the description thereof will be omitted.

Figure 6:
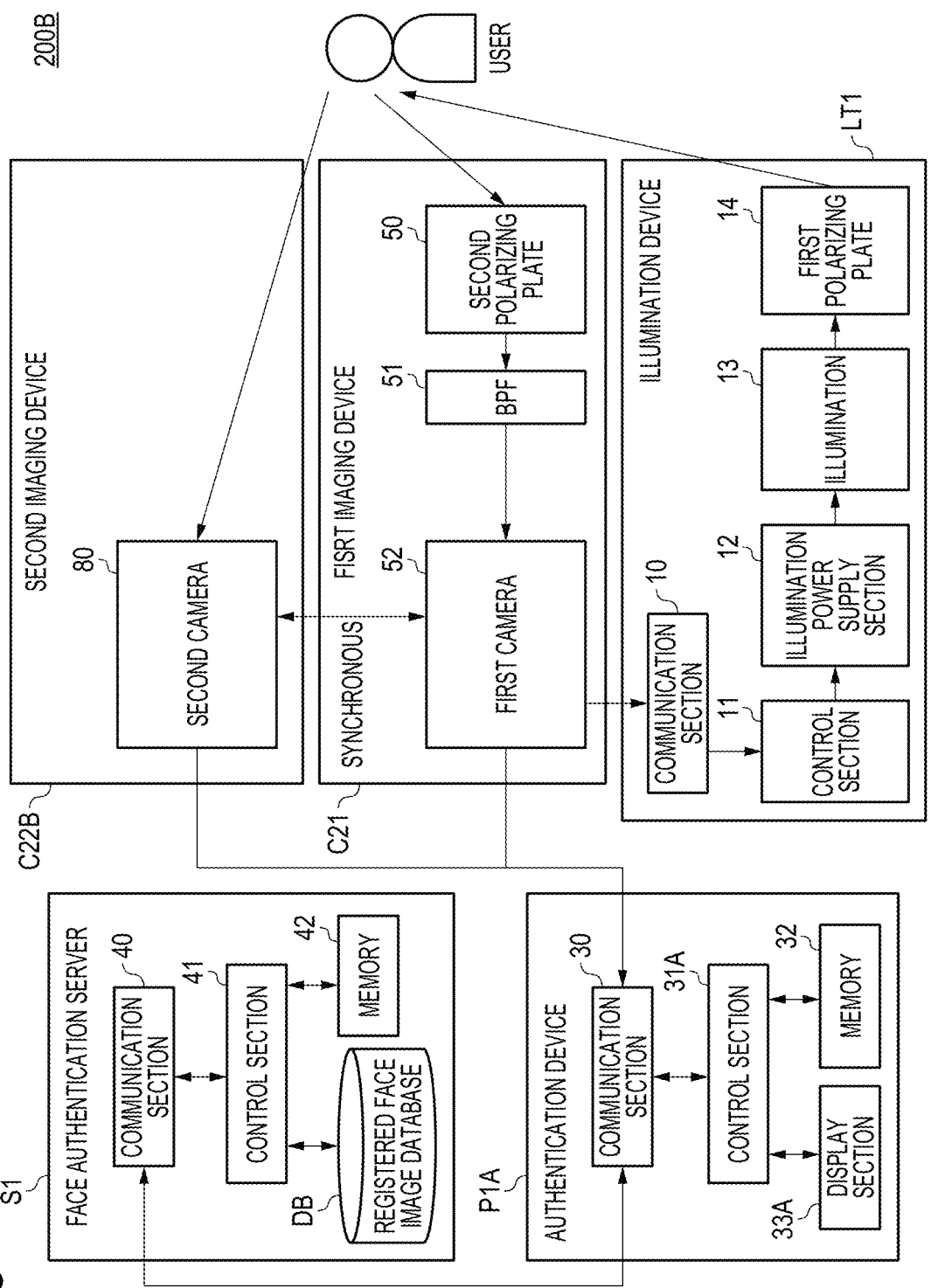
FIG. 6 is a block diagram illustrating an example of an internal configuration of a biometric authentication system according to Modification Example 2 of Embodiment 2.

The biometric authentication system 200B according to Modification Example 2 of Embodiment 2 will be described with reference to FIG. 6. FIG. 6 is a block diagram illustrating an example of an internal configuration of the biometric authentication system 200B according to Modification Example 2 of Embodiment 2.

The second imaging device C22B images a region including the user's face and acquires a second captured image to be displayed on the display section 33A. The second imaging device C22B includes a second camera 80.

The second camera 80 includes at least an image sensor (not shown) and a lens (not shown). The image sensor is a solid-state imaging device including a Si photodiode and, for example, a CCD or CMOS, and converts an optical image of visible light (surface-reflected light) formed on an imaging surface into an electric signal. The second camera 80 executes synchronous control with the first camera 52 of the first imaging device C21. The second camera 80 transmits the converted electric signal (data of the second captured image) to the authentication device P1A.

As described above, the biometric authentication system 200B according to Modification Example 2 of Embodiment 2 can capture the second captured image based on the surface-reflected light (visible light) reflected on the surface of the skin of the user. The surface-reflected light received by the second camera 62 becomes visible light including invisible light emitted to the user through the first polarizing plate 14 and other light that illuminates the user (sunlight, illumination light of visible light indoors and outdoors, or the like). As a result, the biometric authentication system 200B according to Modification Example 2 of Embodiment 2 is suitable for biometric authentication and can realize acquisition of the first captured image captured by receiving scattered light and display of the second captured image captured by receiving surface-reflected light (color image).

Figure 7:
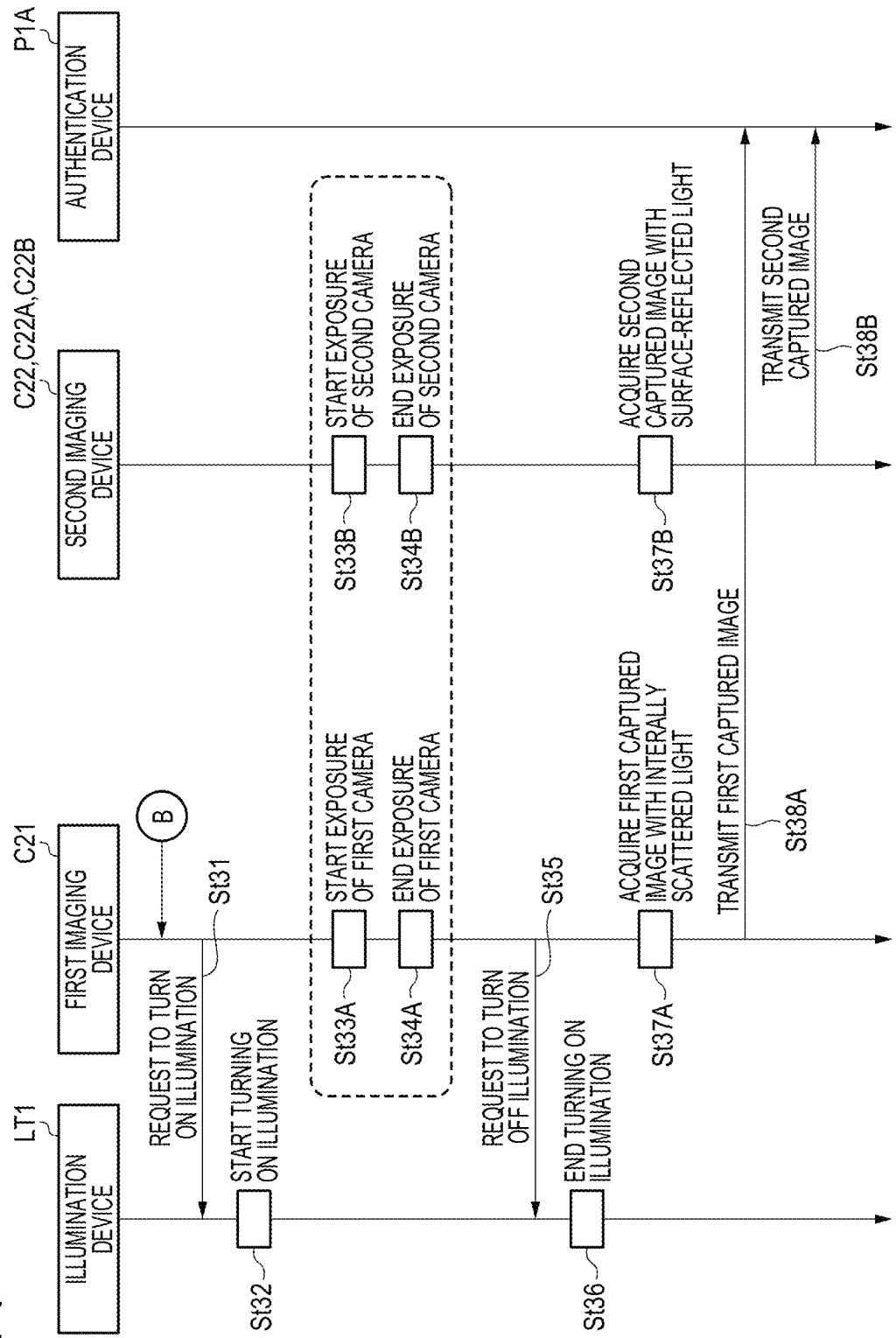
FIG. 7 is a sequence diagram showing an example of an operation procedure of the biometric authentication system according to Embodiment 2, and Modification Examples 1 and 2 of Embodiment 2.
Figure 8:
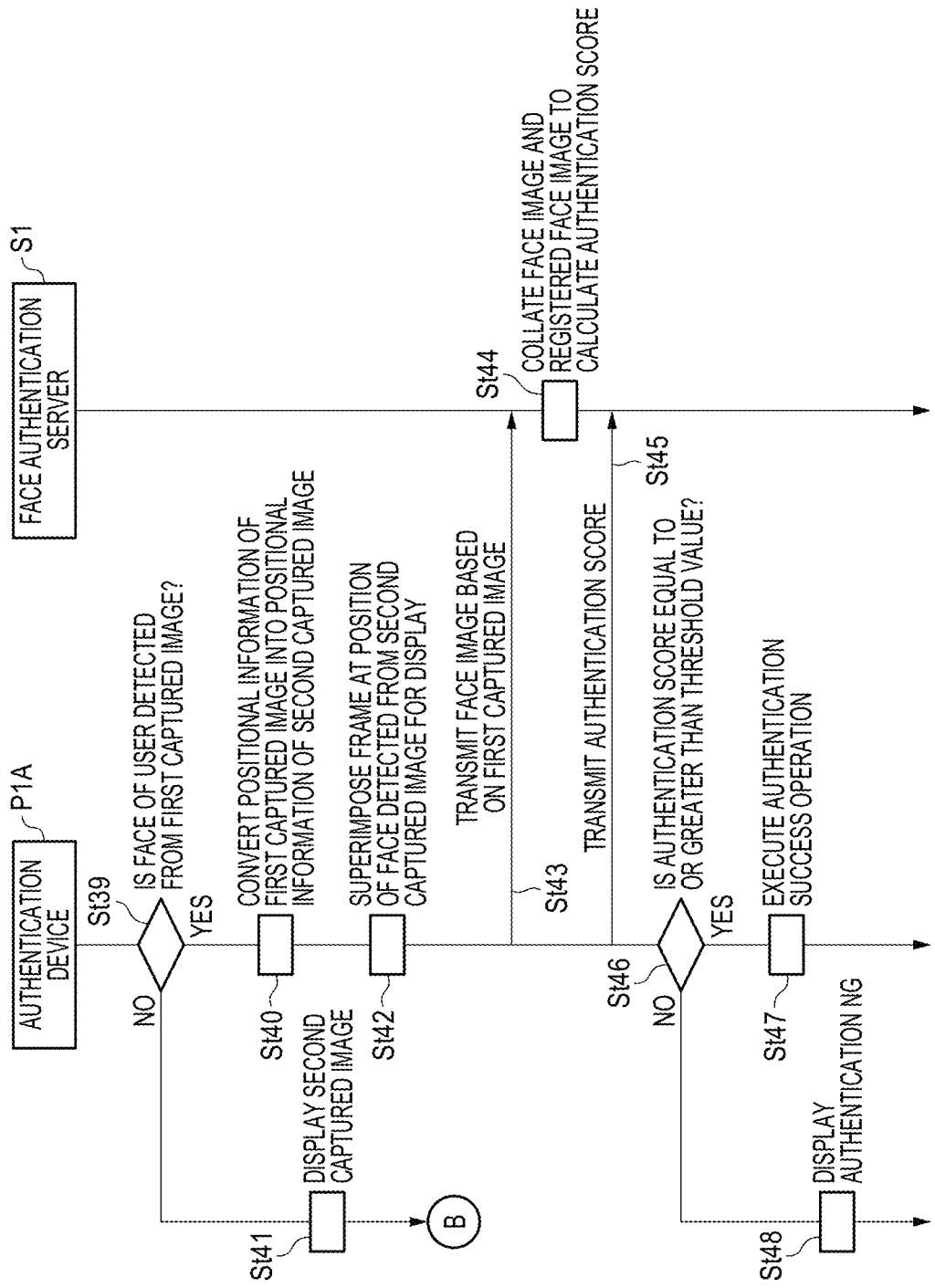
FIG. 8 is a sequence diagram showing an example of the operation procedure of the biometric authentication system according to Embodiment 2, and Modification Examples 1 and 2 of Embodiment 2.

Next, biometric authentication operations executed by the biometric authentication systems 200, 200A, and 200B will be described with reference to each of FIGS. 7 and 8. FIG. 7 is a sequence diagram showing an example of an operation procedure of the biometric authentication systems 200, 200A, and 200B according to Embodiment 2, and Modification Examples 1 and 2 of Embodiment 2. FIG. 8 is a sequence diagram showing an example of an operation procedure of the biometric authentication systems 200, 200A, and 200B according to Embodiment 2, and Modification Examples 1 and 2 of Embodiment 2.

The order in which the processing of steps St31 to St36 are executed may not be the order shown in FIG. 7. For example, the processing of steps St31 and St32 may be executed after the processing of steps St33A and St33B, or the processing of steps St34A and St34B may be executed after the processing of step St36.

The first imaging device C21 generates a control command for turning on the illumination 13 at the same time as starting imaging, and transmits the generated control command to the illumination device LT1 to request to turn on the illumination 13 (St31).

When the illumination device LT1 acquires the control command transmitted from the first imaging device C21, the illumination power supply section 12 starts supplying power to the illumination 13 to turn on the illumination 13 (St32).

The first imaging device C21 starts exposure of the first camera 52 (St33A), and ends the exposure after a predetermined exposure time has elapsed (St34A).

The second imaging devices C22, C22A, and C22B start exposure of the second cameras 62, 72, and 80 (St33B), and end the exposure after a predetermined exposure time has elapsed (St34B). Steps St33A and St33B and steps St34A and St34B are each synchronously processed.

After completing the exposure (imaging), the first imaging device C21 generates a control command for turning off the illumination 13, and transmits the generated control command to the illumination device LT1 to request to turn off the illumination 13 (St35).

When the illumination device LT1 acquires the control command transmitted from the first imaging device C21, the illumination device LT1 ends supplying power to the illumination 13 by the illumination power supply section 12 to turn off the illumination 13 (St36).

The first imaging device C21 acquires the first captured image captured by receiving the internally scattered light (St37A), and transmits the data of the first captured image to the authentication device P1A (St38A).

The second imaging devices C22, C22A, and C22B acquire the second captured image captured by receiving the surface-scattered light (St37B), and transmit the data of the second captured image to the authentication device P1A (St38B).

The authentication device P1A acquires the first captured image transmitted from the first imaging device C21 and the second captured images transmitted from the second imaging devices C22, C22A, and C22B. The authentication device P1A executes image analysis processing on the acquired first captured image, and determines whether or not the face of the user (that is, person) is detected from the first captured image (St39).

When it is determined in the processing of step St39 that the face of the user (person) has been detected from the first captured image (St39, YES), the authentication device P1A calculates the positional information of the detected face of the user. Based on the positional information of the first camera 52 and the positional information of the second cameras 62, 72, and 80, the authentication device P1A converts the positional information of the face of the user on the detected first captured image into the positional information on the second captured image (St40).

On the other hand, when it is determined in the processing of step St39 that the face of the user (person) is not detected from the first captured image (St39, NO), the authentication device P1A displays the second captured image transmitted from the second imaging devices C22, C22A, and C22B on the display section 33A (St41), and returns to the processing of the step St31. The frame FB (see FIG. 10) may not be superimposed on the second captured image to be displayed on the display section 33A in step St41.

The authentication device P1A generates a frame FB (see FIG. 10) indicating the position of the face of the user based on the converted positional information of the face of the user on the second captured image, and superimposes the frame FB on the second captured image. The authentication device P1A displays the second captured image superimposed with the frame FB on the display section 33A (St42).

The authentication device P1A generates a face image obtained by cutting out a region including the face of the user from the first captured image based on the detected positional information of the face of the user, and transmits the face image to the face authentication server S1 (St43).

The face authentication server S1 collates the face image of the user transmitted from the authentication device P1A with the registered face image of each of the plurality of users registered in the registered face image database DB to calculate an authentication score (St44). The face authentication server S1 transmits information on the calculated authentication score to the authentication device P1A (St45).

The authentication device P1A acquires the authentication score transmitted from the face authentication server S1 to determine whether or not the authentication score is equal to or greater than the threshold value (St46).

When it is determined in the processing of step St46 that the authentication score transmitted from the face authentication server S1 is equal to or greater than the threshold value (St46, YES), the authentication device P1A determines that the user is a registered user registered in advance in the registered face image database DB and that the biometric authentication is "OK" (that is, success), and executes a predetermined authentication success operation set in advance (St47).

On the other hand, when it is determined in the processing of step St46 that the authentication score is not equal to or greater than the threshold value (St46, NO), the authentication device P1A determines that the user is not a registered user registered in advance in the registered face image database DB and that the biometric authentication is "NG" (that is, failure). The authentication device P1A generates an authentication failure screen (not shown) for notifying the user of biometric authentication failure, and outputs (displays) the screen on the display section 33 (St48).

As described above, the biometric authentication systems 200, 200A, and 200B according to Embodiment 2, and Modification Examples 1 and 2 of Embodiment 2 can display the second captured image on the display section 33A to present the second captured image to the user and execute biometric authentication by using the first captured image.

Figure 9:
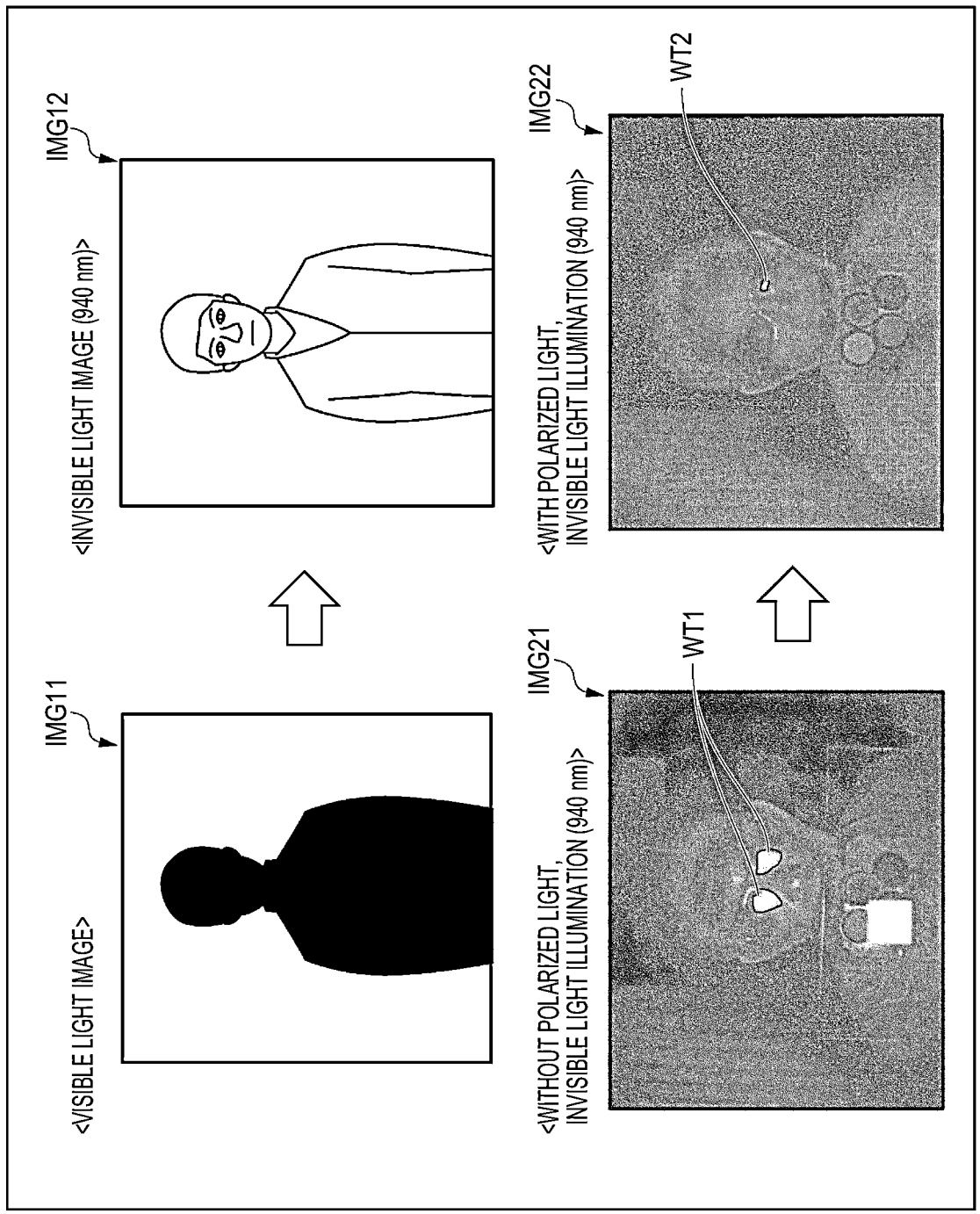
FIG. 9 is a diagram illustrating a visible light image, an invisible light image, and an invisible light image with and without polarized light.

Next, the first captured image captured by the first cameras 22 and 52 will be described with reference to FIG. 9. FIG. 9 is a diagram illustrating a visible light image, an invisible light image, and an invisible light image with and without polarized light. In FIG. 9, an example of the first captured image captured by the first cameras 22 and 52 will be described, but the second captured image (visible light image, invisible light image) captured by the second cameras 62, 72, and 80 is also the same.

A captured image IMG11 is a visible light image, and is a captured image of a backlit user under sunlight outdoors. In the backlit state, the first imaging device C1 or the first imaging device C21 cannot capture the face of the user as shown by the captured image IMG11, and it is difficult to capture an image suitable for biometric authentication.

In the same imaging environment as the captured image IMG11, a captured image IMG12 is a captured image captured by receiving only the invisible light with a wavelength of 940 nm (near-infrared light) with the image sensors of the first cameras 22 and 52 by using BPFs 21 and 51. In other words, the first cameras 22 and 52 can image the face of the user even in a backlit state.

A captured image IMG21 is a captured image captured by receiving only invisible light (near-infrared light) with a wavelength of 940 nm with the image sensors of the first cameras 22 and 52 by using the BPFs 21 and 51. In the captured image IMG21, the user is wearing glasses, and the invisible light illumination with a wavelength of 940 nm emitted by the illumination 13 is reflected on the glasses (region WT1).

In such a case, there is a possibility that the biometric authentication systems 100, 200, 200A, and 200B cannot calculate the feature quantity related to the eyes of the user used for biometric authentication based on the captured image IMG21 due to the invisible light illumination reflected on the glasses.

The captured image IMG22 is a captured image that is captured in the same imaging environment as the captured image IMG21, and that is obtained by: polarizing the scattered light reflected by the user by further using the second polarizing plates 20 and 50 substantially orthogonal to the first polarizing plate 14 of the illumination 13 (crossed Nicols); and receiving with the image sensors of the first cameras 22 and 52 only the invisible light with a wavelength of 940 nm (near-infrared light) out of the light after polarized by the BPFs 21 and 51. In the captured image IMG22, compared to the captured image IMG21, the reflection amount of the invisible light illumination reflected on the glasses worn by the user is suppressed from a region WT1 to a region WT2.

As a result, the biometric authentication systems 100, 200, 200A, and 200B can calculate the feature quantity related to the eyes of the user, which is used for biometric authentication, based on the captured image IMG22.

Figure 10:
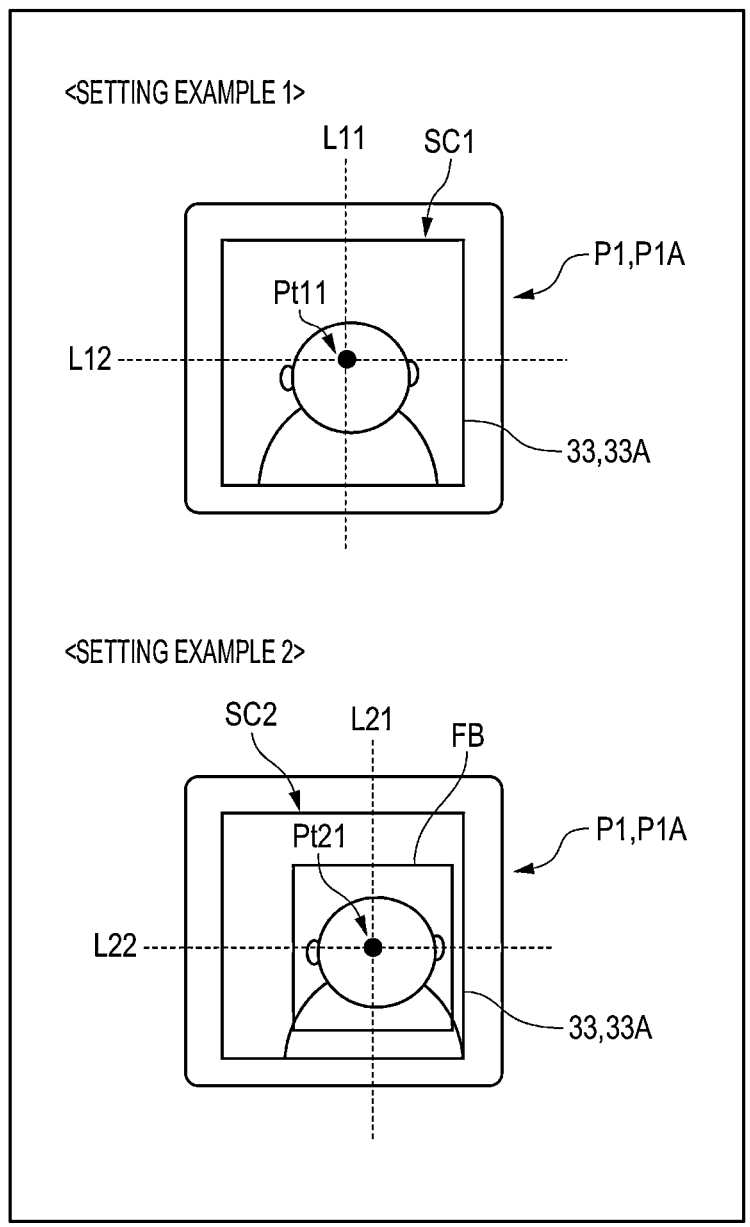
FIG. 10 is a diagram illustrating Setting Examples 1 and 2 of disposition reference points for cameras and illuminations.

Next, with reference to FIG. 10, axes L1 and L2 that serve as the reference for disposition of each device will be described in a disposition example of the first camera 22 and the illumination 13 shown in FIG. 11, a disposition example of the first camera 52, the second cameras 62, 72, and 80, and the illumination 13 shown in FIG. 12, and in a disposition example of the first camera 22 and a plurality of illuminations 13 shown in FIG. 13. FIG. 10 is a diagram illustrating Setting Examples 1 and 2 of disposition reference points Pt11 and Pt21 of the camera (specifically, first cameras 22 and 52, and second cameras 62, 72, and 80) and the illumination 13. In FIG. 10, in Setting Example 1, the axis L1 is indicated by an axis L11, the axis L2 is indicated by an axis L12, and a disposition reference point Pt0 is indicated by the disposition reference point Pt11, and in Setting Example 2, the axis L1 is indicated by an axis L21, the axis L2 is indicated by an axis L22, and the disposition reference point Pt0 is indicated by the disposition reference point Pt21.

Each of the axes L11 and L12 in Setting Example 1 is set with respect to the image displayable regions in the display sections 33 and 33A. The axis L11 bisects the image displayable regions in the display sections 33 and 33A in the width direction (horizontal direction of the paper surface). The axis L12 bisects the image displayable regions in the display sections 33 and 33A in the height direction (vertical direction on the paper surface). The axes L11 and L12 are orthogonal to each other at the disposition reference point Pt11 of the image displayable regions in the display sections 33 and 33A. The disposition reference point Pt11 is the intersection of the diagonal lines in the image displayable regions of the display sections 33 and 33A.

In Setting Example 2, the axis L21 bisects the frame FB (an example of a first frame and a second frame), which is superimposed on the first captured image or the second captured image and indicates a region in which the face of the user is detected, in the width direction (horizontal direction of the paper surface). The axis L22 bisects the frame FB in the height direction (vertical direction on the paper surface). The axes L21 and L22 are orthogonal to each other at the disposition reference point Pt21 of the frame FB that indicates the region where the face of the user is detected. The disposition reference point Pt21 is the intersection of diagonal lines in the frame FB.

Figure 11:
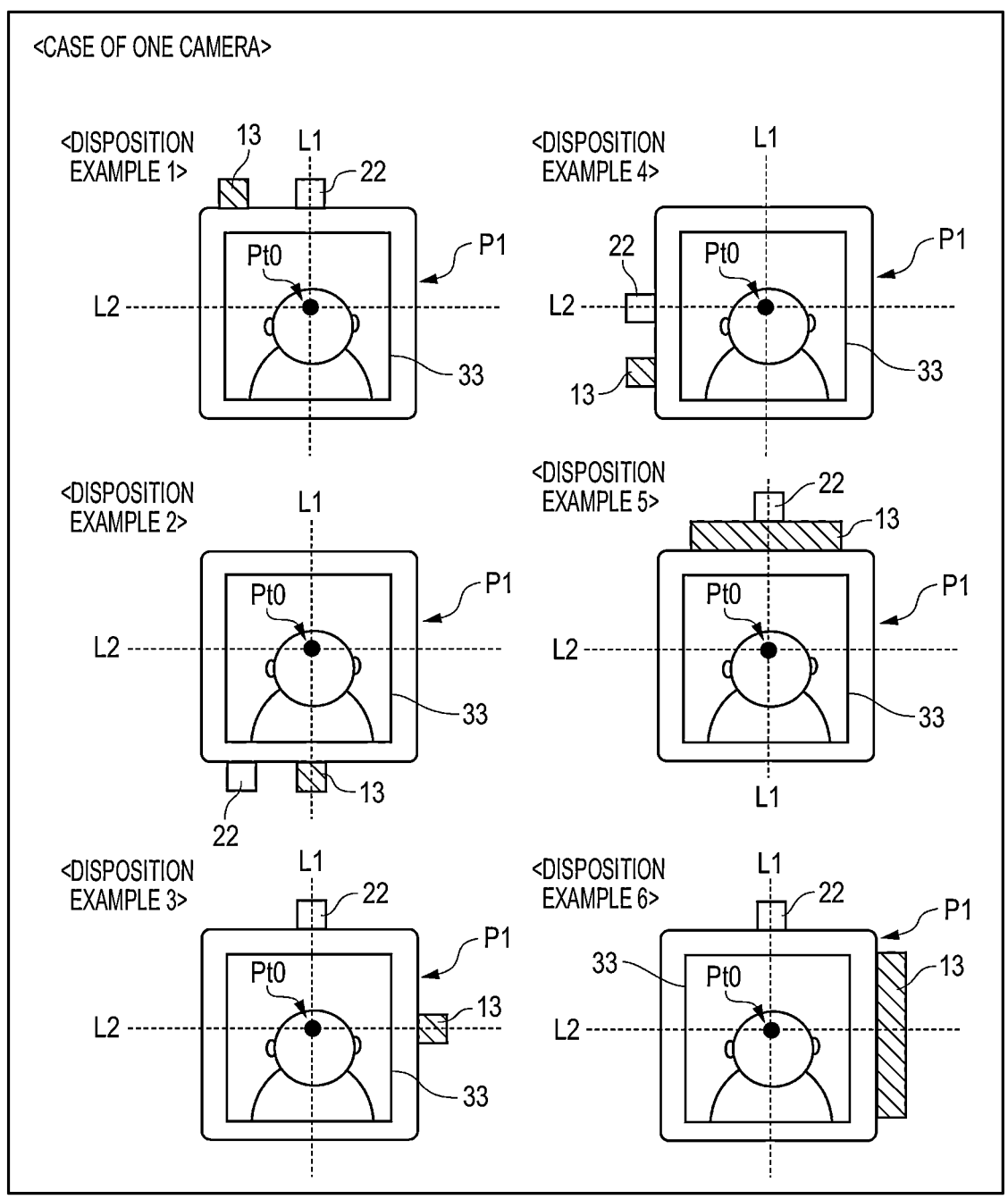
FIG. 11 is a diagram illustrating respective disposition examples of a camera and an illumination when there is one camera.

With reference to FIG. 11, the disposition example of the first camera 22 and the illumination 13 in the biometric authentication system 100 according to Embodiment 1 will be described. FIG. 11 is a diagram illustrating respective disposition examples of the camera when there is one camera (specifically, the first camera 22) and the illumination 13. The disposition reference point Pt0 shown in FIG. 11 may be set at either the disposition reference point Pt11 of Setting Example 1 or the disposition reference point Pt21 of Setting Example 2 shown in FIG. 10.

The first camera 22 and the illumination 13 are disposed at positions that are mutually asymmetric with respect to the disposition reference point Pt0. In the following, disposition examples 1 to 6 of the first camera 22 and the illumination 13 will be described below, but the disposition examples 1 to 6 shown in FIG. 11 are examples, and it is needless to say that the disposition examples are not limited thereto. Also, the illumination 13 may be a surface light source or a point light source.

For example, the first camera 22 in the disposition example 1 is disposed above the display section 33 (upper side of the paper surface) and on the axis L1. The illumination 13 is disposed above the display section 33 (upper side of the paper surface) and on the left side of the first camera 22 on the paper surface.

For example, the illumination 13 in the disposition example 2 is disposed below the display section 33 (lower side of the paper surface) and on the axis L1. The first camera 22 is disposed below the display section 33 (on the lower side of the paper surface) and on the left side of the illumination 13 on the paper surface.

For example, the first camera 22 in the disposition example 3 is disposed above the display section 33 (upper side of the paper surface) and on the axis L1. The illumination 13 is disposed on the side of the display section 33 (on the right side of the paper surface) and on the axis L2.

For example, the first camera 22 in the disposition example 4 is disposed on the side of the display section 33 (left side of the paper surface) and on the axis L2. The illumination 13 is disposed on the side of the display section 33 (on the left side of the paper surface) and below the first camera 22 on the paper surface.

For example, the illumination 13 in the disposition example 5 is disposed above the display section 33 (upper side of the paper surface). The first camera 22 is disposed above the illumination 13 (on the upper side of the paper surface), which is a surface light source, and on the axis L1.

For example, the illumination 13 in the disposition example 6 is disposed on the side of the display section 33 (right side of the paper surface). The first camera 22 is disposed above the display section 33 (upper side of the paper surface) and on the axis L1.

Thereby, the first camera 22 according to Embodiment 1 can suppress the reception of specularly reflected invisible light (near-infrared light with a wavelength of 940 nm) emitted by the illumination 13. In other words, even when the user is wearing glasses, the biometric authentication system 100 can further effectively suppress the reflection of invisible light illumination due to the reception of the specularly reflected light which is specularly reflected by the glasses (region WT2, see FIG. 9). Therefore, the biometric authentication system 100 can calculate the feature quantity of the eyes of the user required for biometric authentication processing from the first captured image.

Next, with reference to FIG. 12, the disposition example of the first camera 52, the second cameras 62, 72, and 80, and the illumination 13 in the biometric authentication systems 200, 200A, and 200B according to Embodiment 2, and Modification Examples 1 and 2 of Embodiment 2 will be described. FIG. 12 is a diagram illustrating respective disposition examples of the cameras when there are two cameras (specifically, the first camera 52 and each of the second cameras 62, 72, and 80) and the illumination 13.

Figure 12:
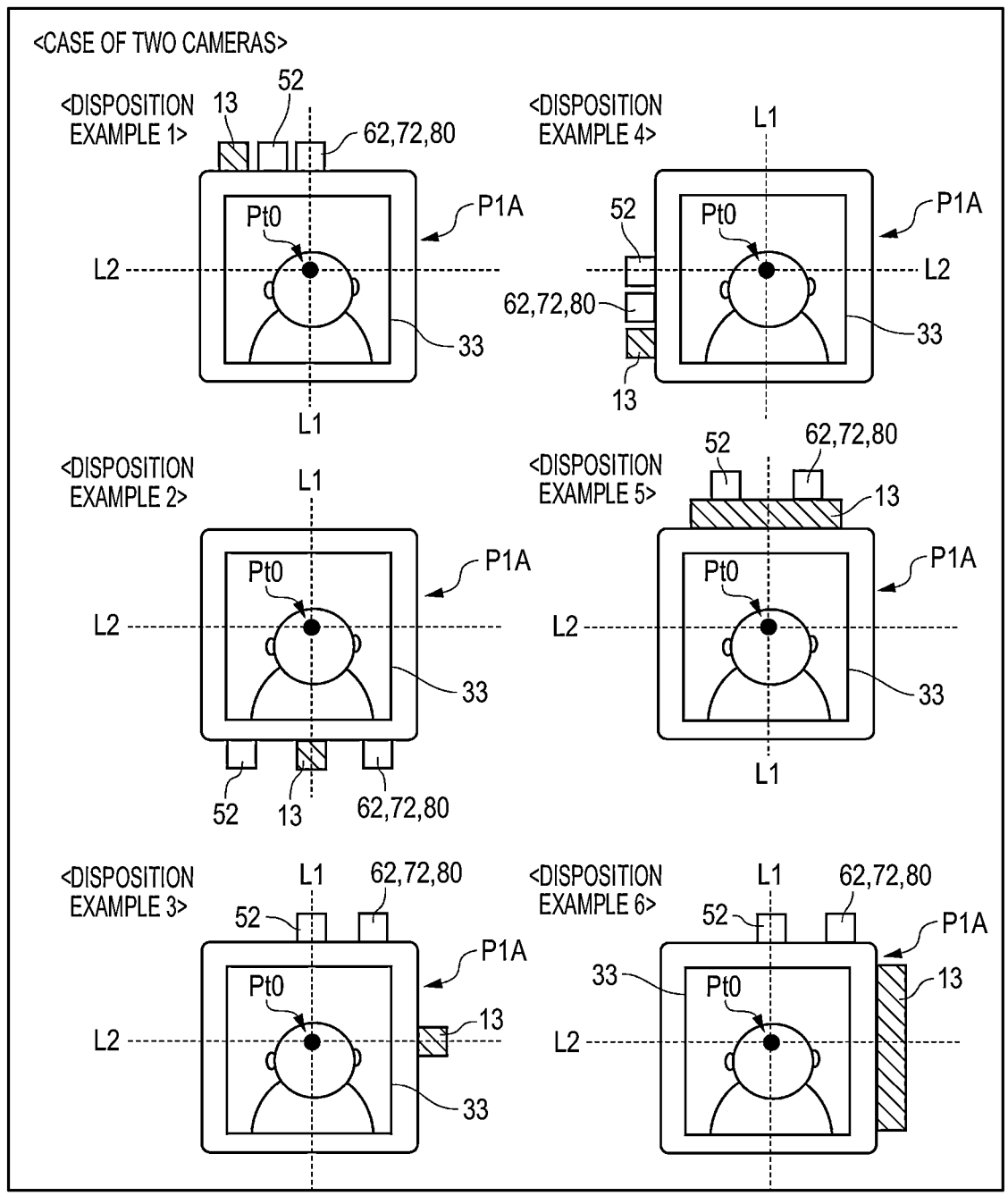
FIG. 12 is a diagram illustrating respective disposition examples of cameras and an illumination when there are two cameras.
Figure 13:
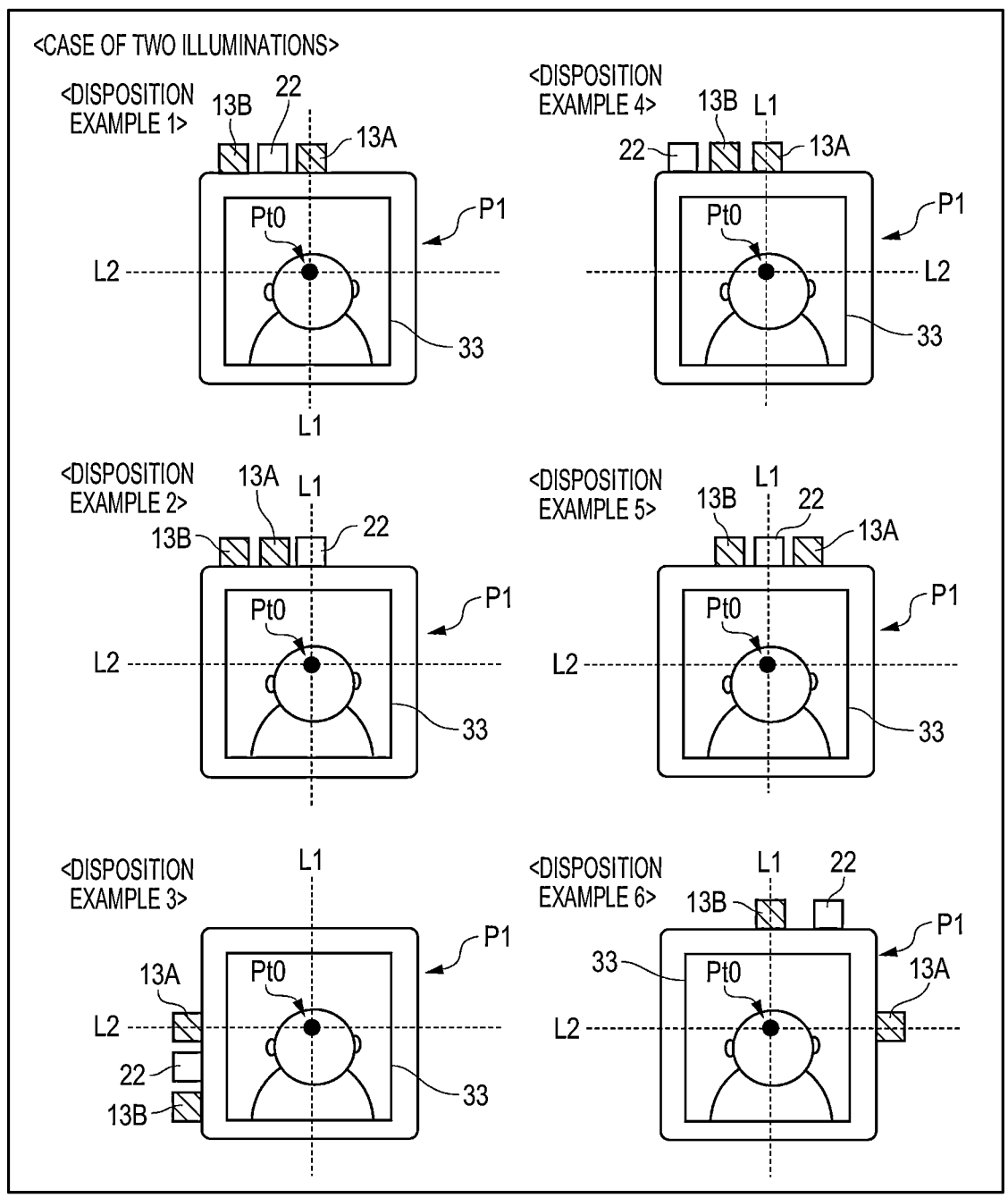
FIG. 13 is a diagram illustrating respective disposition examples of a camera and illuminations when there are two illuminations.

The disposition reference point Pt0 shown in FIG. 12 may be set at either the disposition reference point Pt11 of Setting Example 1 or the disposition reference point Pt21 of Setting Example 2 shown in FIG. 10. Also, the disposition of the first camera 52 and the disposition of each second camera 62, 72, and 80 may be reversed.

The first camera 52 or each second camera 62, 72, and 80, and the illumination 13 are disposed at positions that are mutually asymmetric with respect to the disposition reference point Pt0. In the following, the disposition examples 1 to 6 of the first camera 52, each second camera 62, 72, and 80, and the illumination 13 will be described below, but the disposition examples 1 to 6 shown in FIG. 12 are examples, and it is needless to say that the disposition examples are not limited thereto. Also, the illumination 13 may be a surface light source or a point light source.

For example, the first camera 52, each second cameras 62, 72, and 80, and the illumination 13 in the disposition example 1 are disposed side by side above the display section 33A (upper side of the paper surface). The second cameras 62, 72, and 80 are disposed on the axis L1. The first camera 52 is disposed to the left of the second cameras 62, 72, and 80 on the paper surface. The illumination 13 is disposed to the left of the first camera 52 on the paper surface.

For example, the first camera 52, each second camera 62, 72, and 80, and the illumination 13 in the disposition example 2 are disposed side by side below the display section 33A (lower side of the paper surface). The illumination 13 is disposed on the axis L1. The first camera 52 is disposed to the left of the illumination 13 on the paper surface. Each second camera 62, 72, and 80 is disposed to the right of the illumination 13 on the paper surface.

For example, the first camera 52 and each second camera 62, 72, and 80 in the disposition example 3 are disposed side by side above the display section 33A (upper side of the paper surface), and the illumination 13 is disposed on the side of the display section 33A (right side of the paper surface). The first camera 52 is disposed on the axis L1. Each second camera 62, 72, and 80 is disposed to the right of the first camera 52 on the paper surface. The illumination 13 is disposed on the axis L2.

For example, the first camera 52, each second camera 62, 72, and 80, and the illumination 13 in the disposition example 4 are disposed side by side on the side of the display section 33A (left side of the paper surface). The first camera 52 is disposed on the axis L2. Each second camera 62, 72, and 80 is disposed below the first camera 52 on the paper surface. The illumination 13 is disposed below each second camera 62, 72, and 80 on the paper surface.

For example, the illumination 13 in the disposition example 5 is disposed above the display section 33A (upper side of the paper surface). The first camera 52 is disposed above the illumination 13 (upper side of the paper surface), which is a surface light source, and on the left side of the paper surface with respect to the axis L1. Each second camera 62, 72, and is disposed above the illumination 13 (upper side of the paper surface), which is a surface light source, and on the right side of the paper surface with respect to the axis L1.

For example, the illumination 13 in the disposition example 6 is disposed on the side of the display section 33A (right side of the paper surface). The first camera 52 is disposed above the display section 33A (upper side of the paper surface) and on the axis L1. Each second camera 62, 72, and 80 is disposed above the display section 33A (upper side of the paper surface) and to the right of the first camera 52 on the paper surface.

As a result, the first camera 22 and each of the second cameras 62, 72, and 80 in Embodiment 2, and Modification Examples 1 and 2 of Embodiment 2 can suppress the reception of the specularly reflected light in which the invisible light emitted by the illumination 13 is specularly reflected. In other words, even when the user is wearing glasses, the biometric authentication system 200, 200A, and 200B can further effectively suppress the reflection of invisible light illumination due to the reception of the specularly reflected light which is specularly reflected by the glasses (region WT2, see FIG. 9). Therefore, the biometric authentication systems 200, 200A, and 200B can calculate the feature quantity of the eyes of the user required for biometric authentication processing from the first captured image.

Next, with reference to FIG. 13, respective disposition examples of the first camera 22 and the two illuminations 13A and 13B in the biometric authentication system 100 according to Embodiment 1 will be described. FIG. 13 is a diagram illustrating respective disposition examples of the camera (the first camera 22) and the illuminations 13A and 13B when there are two of the illuminations 13A and 13B. The disposition reference point Pt0 shown in FIG. 13 may be set at either the disposition reference point Pt11 of Setting Example 1 or the disposition reference point Pt21 of Setting Example 2 shown in FIG. 10. In addition, in the description of FIG. 13, in order to make the description easier to understand, one illumination 13 is given the code "13A" and the other illumination 13 is given the code "13B" to describe the disposition of each of the two illuminations 13.

The first camera 22 and the two illuminations 13A and 13B are each disposed at positions that are mutually asymmetric with respect to the disposition reference point Pt0. In the following, respective disposition examples 1 to 6 of the first camera 22 and the two illuminations 13A and 13B will be described below, but the disposition examples 1 to 6 shown in FIG. 13 are examples, and it is needless to say that the disposition examples are not limited thereto. In addition, each of the two illuminations 13A and 13B may be a surface light source, a point light source, one illumination may be a surface light source, and the other illumination may be a surface light source.

For example, each of the illuminations 13A and 13B and the first camera 22 in the disposition example 1 are disposed side by side above the display section 33 (upper side of the paper surface). The illumination 13A is disposed on the axis L1. The first camera 22 is disposed to the left of the illumination 13A on the paper surface. The illumination 13B is disposed on the left side of the first camera 22 on the paper surface.

For example, the illuminations 13A and 13B, and the first camera 22 in the disposition example 2 are disposed side by side above the display section 33 (upper side of the paper surface). The first camera 22 is disposed on the axis L1. The illumination 13A is disposed on the left side of the first camera 22 on the paper surface. The illumination 13B is disposed on the left side of the illumination 13A on the paper surface.

For example, the illuminations 13A and 13B, and the first camera 22 in the disposition example 3 are disposed side by side on the side of the display section 33 (left side of the paper surface). The illumination 13A is disposed on the axis L2. The first camera 22 is disposed below the illumination 13A on the paper surface. The illumination 13B is disposed below the first camera 22 on the paper surface.

For example, each of the illuminations 13A and 13B and the first camera 22 in the disposition example 4 are disposed side by side above the display section 33 (upper side of the paper surface). The illumination 13A is disposed on the axis L1. The illumination 13B is disposed to the left of the illumination 13A (on the left side of the paper surface). The first camera 22 is disposed to the left of the illumination 13B (on the left side of the paper surface).

For example, each of the illuminations 13A and 13B and the first camera 22 in the disposition example 5 are disposed side by side above the display section 33 (upper side of the paper surface). The first camera 22 is disposed on the axis L1. The illumination 13A is disposed to the right of the first camera 22 (on the right side of the paper surface). The illumination 13B is disposed to the left of the first camera 22 (on the left side of the paper surface).

For example, the illumination 13B in the disposition example 6 is disposed above the display section 33 (upper side of the paper surface) and on the axis L1. The first camera 22 is disposed above the display section 33 (upper side of the paper surface) and to the right of the illumination 13B (right side of the paper surface). The illumination 13A is disposed on the side of the display section 33 (right side of the paper surface) and on the axis L2.

Thereby, the first camera 22 according to Embodiment 1 can suppress the reception of specularly reflected light in which the invisible light emitted by each of the two illuminations 13A and 13B is specularly reflected. Therefore, even when the user is wearing glasses, the biometric authentication system 100 can further effectively suppress the reflection of invisible light illumination due to the reception of the specularly reflected light which is specularly reflected by the glasses (region WT2, see FIG. 9). Therefore, the biometric authentication system 100 can calculate the feature quantity of the eyes of the user required for biometric authentication processing from the first captured image.

As described above, the biometric authentication systems 100, 200, 200A, and 200B according to Embodiments 1 and 2, and Modification Examples 1 and 2 of Embodiment 2 (an example of an authentication system) includes at least one illumination 13 that irradiates a user (an example of a person to be authenticated) with invisible light, the first imaging devices C1 and C21 that image the user irradiated with the invisible light, and the authentication devices P1 and PIA that are capable of communicating with the first imaging devices C1 and C21 and execute authentication of the user based on the first captured images (examples of the first invisible light images) captured by the first imaging devices C1 and C21. The illumination 13 emits invisible light polarized in the first direction by the first polarizing plate 14. The first imaging devices C1 and C21 receive invisible light polarized in a second direction substantially orthogonal to the first direction by the second polarizing plates 20 and 50 to image the user.

As a result, the biometric authentication systems 100, 200, 200A, and 200B according to Embodiments 1 and 2, and Modification Examples 1 and 2 of Embodiment 2 can more effectively suppress the reflection of invisible light illumination on the first captured image such as the captured image IMG22 shown in FIG. 9 by polarizing the invisible light with a wavelength of 940 nm by the second polarizing plates 20 and 50. That is, the biometric authentication systems 100, 200, 200A, and 200B can more effectively suppress the reflection of invisible light on the first captured image used for calculating the feature quantity of the biological information of a user, and can acquire the first captured image more suitable for biometric authentication (that is, the feature quantity of the user used for biometric authentication can be calculated).

Further, as described above, in the biometric authentication systems 100, 200, 200A, and 200B according to Embodiments 1 and 2, and Modification Examples 1 and 2 of Embodiment 2, the invisible light is near-infrared light with a wavelength of 940 nm. As a result, the biometric authentication systems 100, 200, 200A, and 200B according to Embodiments 1 and 2, and Modification Examples 1 and 2 of Embodiment 2 can acquire the first captured image from which a feature quantity of a user used for biometric authentication can be calculated when imaging outdoors or even when the user's face is in a backlit state by capturing the first captured image at a wavelength of 940 nm having a large attenuation amount of energy of sunlight due to moisture in air.

Further, as described above, the authentication device P1 in the biometric authentication system 100 according to Embodiment 1 detects the face of the user appearing in the first captured image, generates the frame FB (an example of the first frame) showing the position of the face of the user appearing in the first captured image based on the positional information of the face of the user on the detected first captured image, superimposes the frame FB on the first captured image, and displays the first captured image superimposed with the frame FB on the display section 33 (an example of a monitor). Thereby, the biometric authentication system 100 according to Embodiment 1 can present the user with the first captured image used for biometric authentication.

In addition, as described above, the biometric authentication systems 200, 200A, and 200B according to Embodiment 2, and Modification Examples 1 and 2 of Embodiment 2 include the second imaging devices C22, C22A, and C22B that are capable of communicating with the authentication device P1A and receive the surface-reflected light of the user irradiated with invisible light for imaging. The second imaging devices C22, C22A, and C22B transmit the second captured images of the user to the authentication devices P1 and P1A. The authentication device P1A displays the second captured images on display section 33A. As a result, the biometric authentication systems 200, 200A, and 200B according to Embodiment 2, and Modification Examples 1 and 2 of Embodiment 2 can present the second captured image captured by receiving surface-reflected light at approximately the same timing as the first captured image used for biometric authentication to the user. The second captured image captured by receiving surface-reflected light more effectively suppress the reflection of blood vessels, whiskers, and the like, compared with the first captured image captured by receiving the internally scattered light scattered inside the skin, and can reduce the difference between the user appearing in the second captured image and the actual appearance of the user.

Further, as described above, the authentication device PIA in the biometric authentication systems 200, 200A, and 200B according to Embodiment 2, and Modification Examples 1 and 2 of Embodiment 2 detects the face of the user appearing in the first captured image, generates the frame FB (an example of the second frame) showing the position of the face of the user appearing in the second captured image based on the positional information of the face of the user on the detected first captured image, superimposes the frame FB on the second captured image, and displays the second captured image superimposed with the frame FB on the display section 33A. As a result, the biometric authentication systems 200, 200A, and 200B according to Embodiment 2, and Modification Examples 1 and 2 of Embodiment 2 can show a region in which the face of the user is detected in the second captured image with the frame FB.

Moreover, as described above, in the biometric authentication systems 200 and 200A according to Embodiment 2, and Modification Example 1 of Embodiment 2, the second captured image is an invisible light image. The second imaging devices C22 and C22A receive light through the BPFs 61 and 71 (an example of filters) that transmit invisible light out of the surface-reflected light that is reflected on the surface of the skin of the user to image the user. As a result, since the biometric authentication systems 200 and 200A according to Embodiment 2, and Modification Example 1 of Embodiment 2 can capture the second captured image with a more clear face of a user even when the face of the user is in a backlit state to acquire the second captured image by receiving invisible light (near-infrared light with a wavelength of 940 nm) out of surface-reflected light since the reflection of the blood vessels, whiskers, and the like of a user appearing in the second captured image is suppressed and the amount of attenuation of energy of sunlight is increased by moisture in the air.

Moreover, as described above, in the biometric authentication system 200 according to Embodiment 2, the second captured image is an invisible light image. The second imaging device C22 polarizes the surface-reflected light that is reflected by the user in a third direction substantially parallel to the first direction by the third polarizing plate 60, and receives the invisible light after polarization to image the user. As a result, since the biometric authentication system 200 according to Embodiment 2 can capture the second captured image with a more clear face of a user even when the face of the user is in a backlit state to acquire the second captured image by receiving invisible light (near-infrared light with a wavelength of 940 nm) out of surface-reflected light since the reflection of the blood vessels, whiskers, and the like of a user appearing in the second captured image is suppressed and the amount of attenuation of energy of sunlight is increased by moisture in the air.

Moreover, as described above, in the biometric authentication system 200B according to Modification Example 2 of Embodiment 2, the second captured image is a visible light image. The second imaging device C22B receives the surface-reflected light that is reflected by the user and images the user. Thereby, the biometric authentication system 200B according to Modification Example 2 of Embodiment 2 can capture a visible light (color) image as the second captured image to be presented to the user.

As described above, the authentication device P1 in the biometric authentication system 100 according to Embodiment 1 includes the display section 33 that displays the first captured image. The illumination 13 and the first imaging device C1 are disposed at positions that are respectively asymmetric with respect to the center position (for example, the disposition reference point Pt11 shown in FIG. 10) of the display region for displaying the first captured image of the display section 33. As a result, the biometric authentication system 100 according to Embodiment 1 can prevent the reception of the specularly reflected light (light of invisible light illumination) in which the invisible light illumination by the illumination 13 is specularly reflected by the face of the user, thereby more effectively suppressing the reflection of the invisible light illumination on the captured first captured image.

As described above, the illumination 13 and the first imaging device C1 in the biometric authentication system 100 according to Embodiment 1 are disposed at positions (for example, the disposition reference point Pt21 shown in FIG. 10) that are respectively asymmetric with respect to the center position of the frame FB superimposed on the first captured image. As a result, the biometric authentication system 100 according to Embodiment 1 can prevent the reception of the specularly reflected light (light of invisible light illumination) in which the invisible light illumination by the illumination 13 is specularly reflected by the face of the user, thereby more effectively suppressing the reflection of the invisible light illumination on the captured first captured image.

Further, as described above, the illumination 13, the first imaging device C21, and the second imaging devices C22, C22A, and C22B in the biometric authentication systems 200, 200A, and 200B according to Embodiment 2, and Modification Examples 1 and 2 of Embodiment 2 are disposed at positions that are respectively asymmetric with the center position (for example, the disposition reference point Pt11 shown in FIG. 10) of the display region for displaying the second captured image of the display section 33A. As a result, the biometric authentication systems 200, 200A, and 200B according to Embodiment 2, and Modification Examples 1 and 2 of Embodiment 2 can prevent the reception of the specularly reflected light (light of invisible light illumination) in which the invisible light illumination by the illumination 13 is specularly reflected by the face of the user, thereby more effectively suppressing the reflection of the invisible light illumination on the captured first captured image and the second captured image.

Further, as described above, the illumination 13, the first imaging device C21, and the second imaging devices C22, C22A, and C22B in the biometric authentication systems 200, 200A, and 200B according to Embodiment 2, and Modification Examples 1 and 2 of Embodiment 2 are disposed at positions that are respectively asymmetric with respect to the center position (for example, the disposition reference point Pt21 shown in FIG. 10) of the frame FB superimposed on the second captured image. As a result, the biometric authentication systems 200, 200A, and 200B according to Embodiment 2, and Modification Examples 1 and 2 of Embodiment 2 can prevent the reception of the specularly reflected light (light of invisible light illumination) in which the invisible light illumination by the illumination 13 is specularly reflected by the face of the user, thereby more effectively suppressing the reflection of the invisible light illumination on the captured first captured image and the second captured image.

Further, as described above, in the biometric authentication system 100 according to Embodiment 1, when the user is authenticated, the authentication device P1 executes an authentication success operation set in advance (an example of a predetermined operation), and when the user is not authenticated, displays the first captured image on the display section 33. Thereby, the biometric authentication system 100 according to Embodiment 1 can notify the user of the success or failure of the biometric authentication based on the authentication result of the user based on the first captured image.

Further, as described above, in the biometric authentication systems 200, 200A, and 200B according to Embodiment 2, and Modification Examples 1 and 2 of Embodiment 2, when the user is authenticated, the authentication device P1A executes a predetermined operation set in advance, and when the user is not authenticated, displays the second captured image on the display section 33A. As a result, the biometric authentication systems 200, 200A, and 200B according to Embodiment 2, and Modification Examples 1 and 2 of Embodiment 2 can notify the user of the success or failure of biometric authentication based on the authentication result of the user based on the first captured image.

Embodiment 3

The biometric authentication systems 100, 200, 200A, and 200B according to Embodiment 1 to Modification Examples 2 of Embodiment 2 show an example of determining the respective disposition of the cameras (the first cameras 22 and 52 or the second cameras 62, 72, and 80) and the illumination 13 using the user appearing on the display sections 33 and 33A or the display sections 33 and 33A as a disposition reference point. A biometric authentication system 300 according to Embodiment 3 describes an example of determining the respective dispositions of the camera (the first cameras 22 and 52 or the second cameras 62, 72, and 80) and the illumination 13 without using the user appearing on the display sections 33 and 33A or the display sections 33 and 33A as a disposition reference point.

The biometric authentication system 300 according to Embodiment 3 includes a configuration in which the display sections 33 and 33A are omitted from the respective authentication devices P1 and P1A of the biometric authentication systems 100, 200, 200A, and 200B according to Embodiment 1 to Modification Example 2 of Embodiment 2 but which new line-of-sight guiding sections In0, Int1, In12, In21, In31, In32, and In33 are included. In the following description, the biometric authentication system 300 according to Embodiment 3 will be described by using the same symbols for the same configurations as those of the devices constituting the biometric authentication systems 100, 200, 200A, and 200B according to Embodiment 1 to Modification Example 2 of Embodiment 2.

The line-of-sight guiding sections In0, In11, In12, In21, In31, In32, and In33 guide the user's line of sight to a predetermined line-of-sight direction or line-of-sight position. In Embodiment 3, the position of the user's line of sight indicates the midpoint of a line segment connecting the right eye and left eye of the user. In addition, the direction of the user's line of sight indicates the direction in which the user's line of sight is directed, starting from the midpoint of a line segment connecting the right eye and the left eye of the user.

The line-of-sight guiding section In0 guides the user's line of sight by directing the user's line of sight to the line-of-sight guiding section In0 itself. The line-of-sight guiding section In0 may be, for example, a mark, a character, and a LED (visible light illumination) provided in the housings of the illumination 13, the first cameras 22 and 52, or the second cameras 62, 72, and 80, an opening portion of the lens peripheral edge of the first cameras 22 and 52 or the second cameras 62, 72, and 80, a projection projected by a projector, or the like, and a mirror for reflecting the user's own face instead of the display sections 33 and 33a.

Also, the line-of-sight guiding sections In11, In12, In21, In31, In32, and In33 guide the user's own position (standing position, passage position, and the like) to guide the user's line of sight to a predetermined position (for example, the user's traveling direction, the front of the user, and the like). The line-of-sight guiding sections In11, In12, In21, In31, In32, and In33 may be, for example, regions or marks indicating the user's standing position, gates, passages, walls, or the like that guide the user's direction of travel.

Here, axes L3 and L4 that serve as the reference for disposition of each device will be described in a disposition example of the first camera 22 and the illumination 13 shown in FIG. 14, a disposition example of the first camera 52, the second cameras 62, 72, and 80, and the illumination 13 shown in FIG. 15, and in a disposition example of the first camera 22 and a plurality of illuminations 13 shown in FIG. 16.

Figure 14:
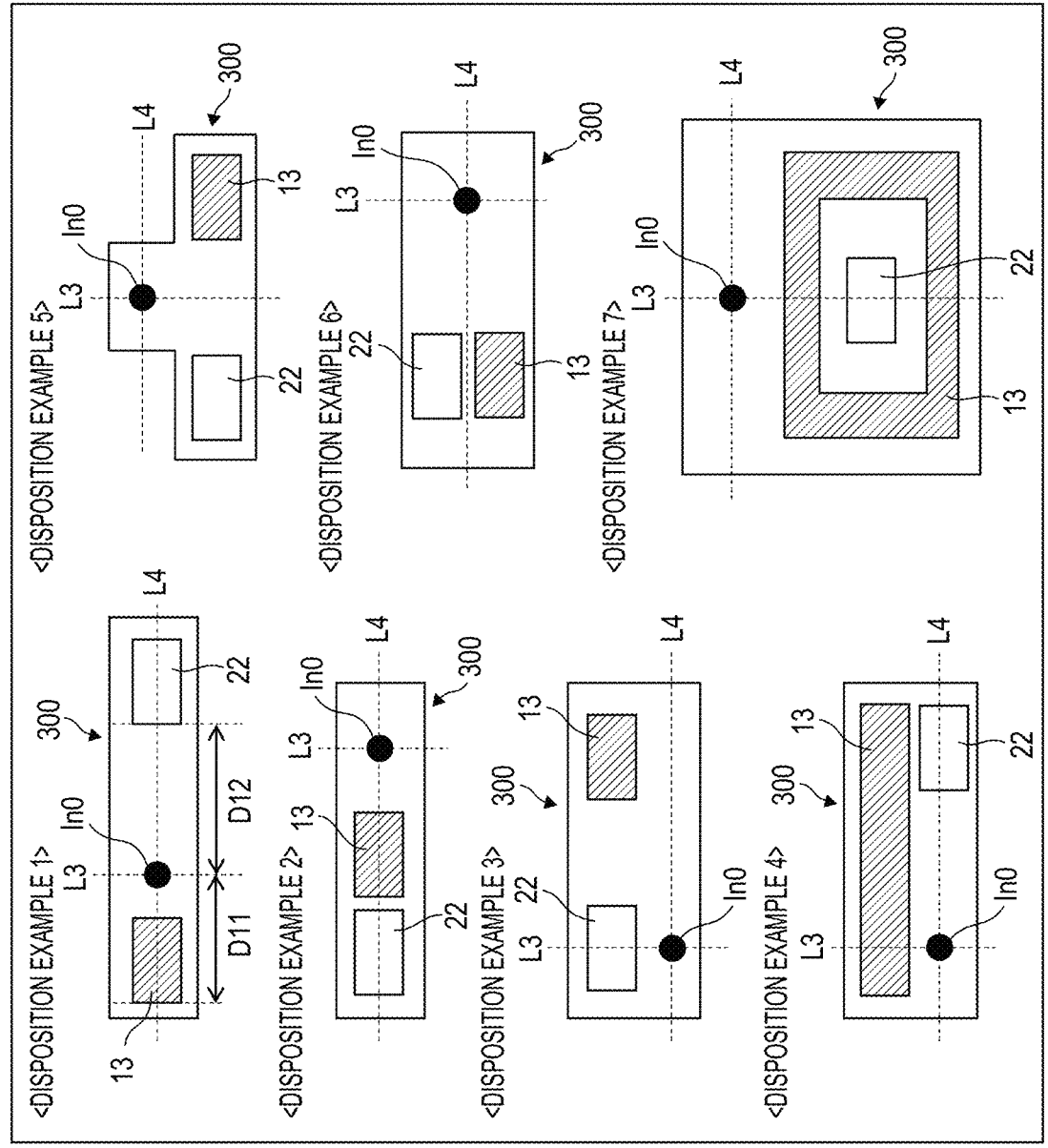
FIG. 14 is a diagram illustrating respective disposition examples of a camera, a light, and a line-of-sight guiding section when there is one camera.
Figure 15:
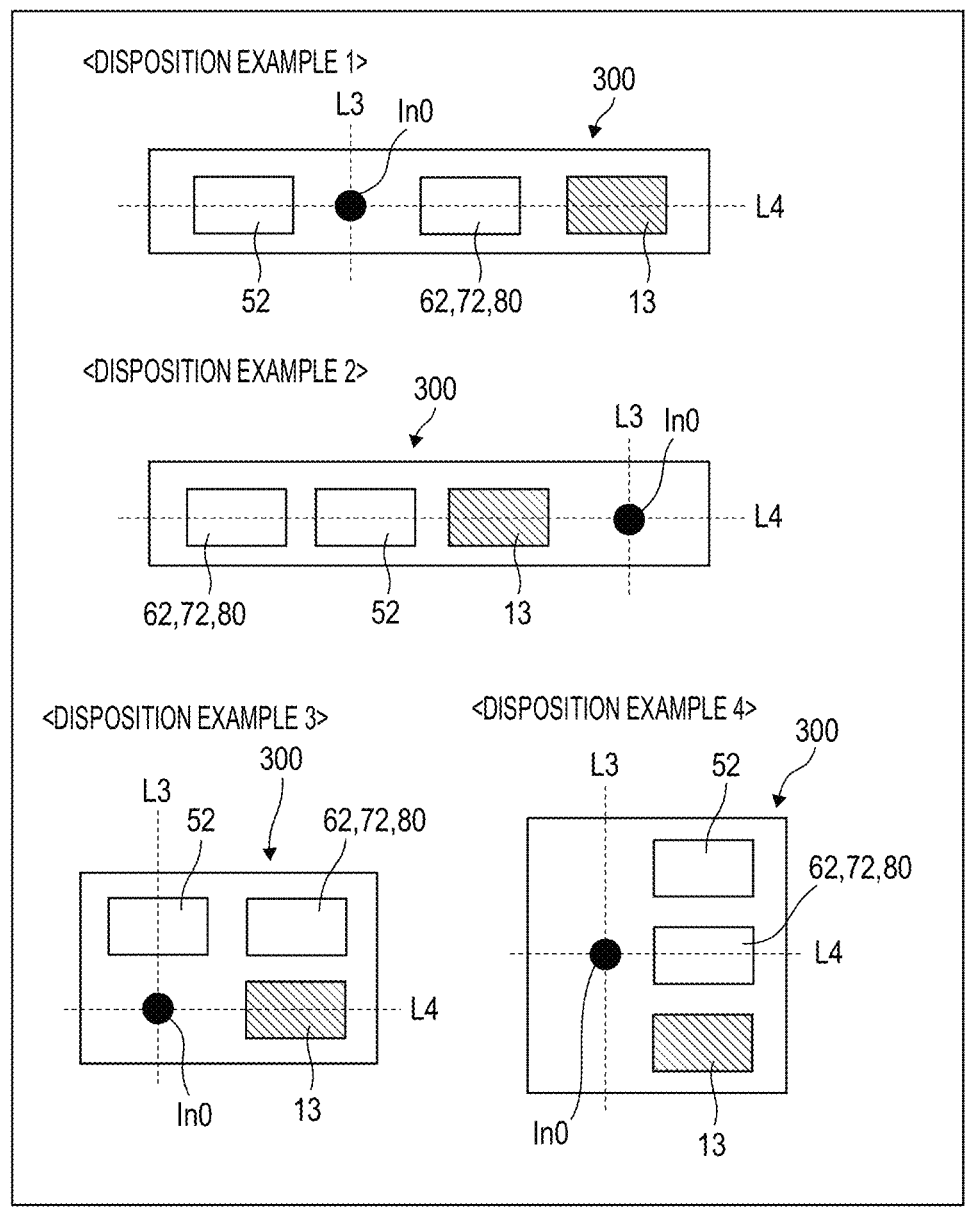
FIG. 15 is a diagram illustrating respective disposition examples of cameras, a light, and a line-of-sight guiding section when there are two cameras.
Figure 16:
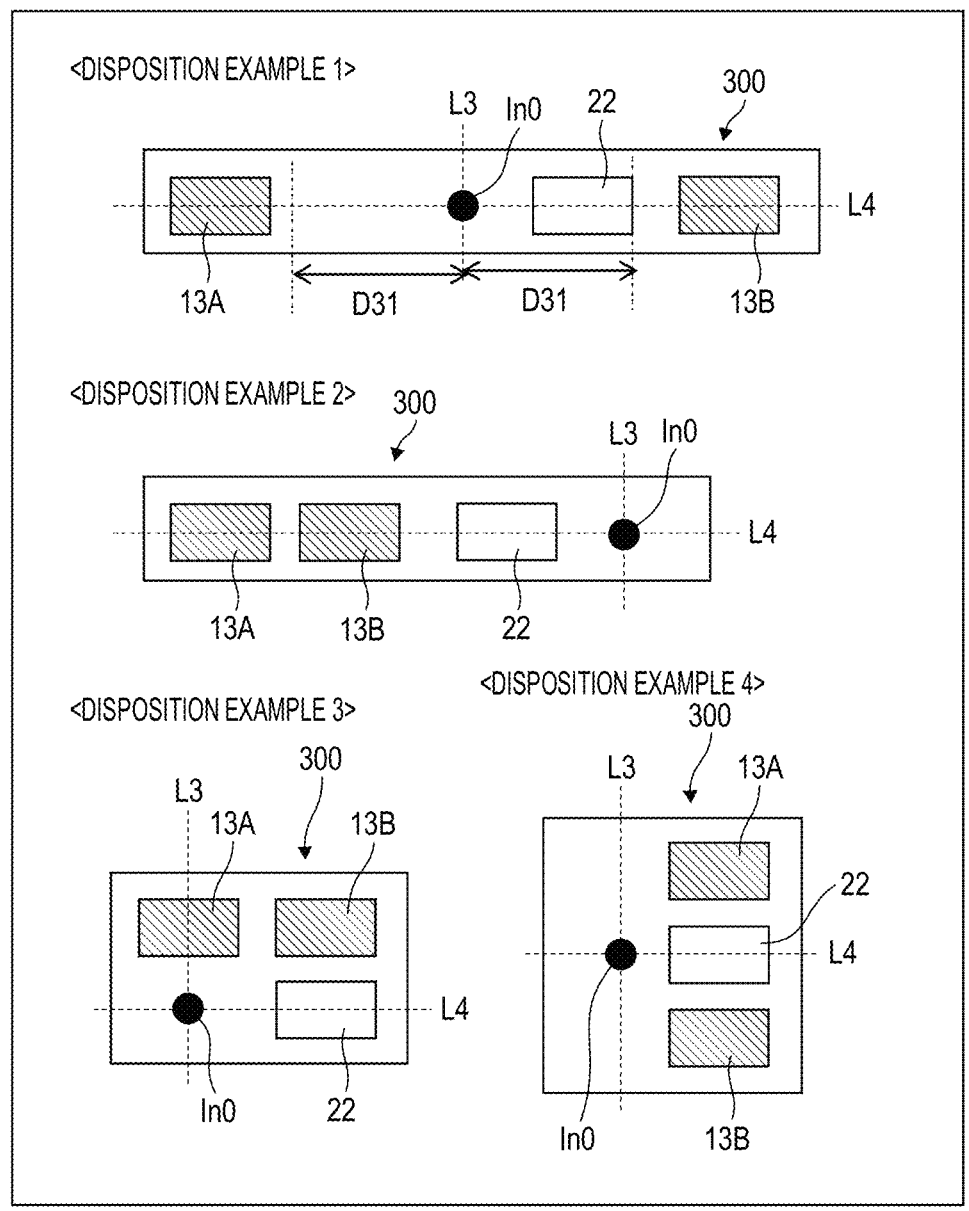
FIG. 16 is a diagram illustrating respective disposition examples of a camera, illuminations, and a line-of-sight guiding section when there are two illuminations.

Each of the axes L3 and L4 shown in FIGS. 14 to 16 is set with respect to the line-of-sight guiding section In0. The axis L3 and axis L4 are orthogonal to each other at the line-of-sight guiding section In0. The axis L3 is an axis that indicates a horizontal direction (horizontal direction on the paper surface) that passes through the line-of-sight guiding section In0. The axis L4 is an axis that indicates a vertical direction (vertical direction on the paper surface) passing through the line-of-sight guiding section In0.

With reference to FIG. 14, the disposition example of the first camera 22 and the illumination 13 in the biometric authentication system 300 according to Embodiment 3 will be described. FIG. 14 is a diagram illustrating respective disposition examples of the camera (specifically, the first camera 22), the illumination 13, and the line-of-sight guiding section In0 when there is only one camera. In addition, the biometric authentication system 300 shown in FIG. 14 shows an example in which the first camera 22, the illumination 13, and the line-of-sight guiding section In0 are integrally configured, but some or all may be configured separately.

The first camera 22 and the illumination 13 are disposed at positions that are mutually asymmetric with respect to the line-of-sight guiding section In0, which is the line-of-sight position of the user. In the following, the disposition examples 1 to 7 of the first camera 22, the illumination 13, and the line-of-sight guiding section In0 will be described below, but the disposition examples 1 to 7 shown in FIG. 14 are examples, and it is needless to say that the disposition examples are not limited thereto. Also, the illumination 13 may be a surface light source or a point light source.

For example, the first camera 22, the illumination 13, and the line-of-sight guiding section In0 in the disposition example 1 are disposed on a straight line (axis L4). The illumination 13 is disposed on the left side of the line-of-sight guiding section In0 (left side of the paper surface). The first camera 22 is disposed on the right side of the line-of-sight guiding section In0 (right side of the paper surface). Here, a distance D11<a distance D12.

For example, the first camera 22, the illumination 13, and the line-of-sight guiding section In0 in the disposition example 2 are disposed on a straight line (axis L4), respectively. The illumination 13 is disposed on the left side of the line-of-sight guiding section In0 (left side of the paper surface). The first camera 22 is disposed on the left side of the illumination 13 (left side of the paper surface).

The disposition examples 1 and 2 describe an example in which the first camera 22, the illumination 13, and the line-of-sight guiding section In0 are each disposed on a straight line (axis L4), but each may be disposed on the axis L3 under similar conditions.

For example, the first camera 22 in the disposition example 3 is disposed above the line-of-sight guiding section In0 (upper side of the paper surface) and on the axis L3. The illumination 13 is disposed on the right side of the first camera 22 (right side of the paper surface).

For example, the illumination 13 in the disposition example 4 is a surface light source, and is disposed over the upper side of the line-of-sight guiding section In0 and the first camera 22 (upper side of the paper surface). The first camera 22 is disposed on the right side (the right side of the paper surface) of the line-of-sight guiding section In0 and on the axis L4.

For example, the first camera 22 in the disposition example 5 is disposed at the lower left of the line-of-sight guiding section In0 (lower left of the paper surface). The illumination 13 is disposed at the lower right (at the lower right on the paper surface) of the line-of-sight guiding section In0.

For example, the first camera 22 in the disposition example 6 is disposed at the upper left (upper left of the paper surface) of the line-of-sight guiding section In0. The illumination 13 is disposed at the lower left of the line-of-sight guiding section In0 (lower left on the paper surface). The first camera 22 and the illumination 13 are disposed at positions that are line-symmetric with respect to each other with respect to the axis L4.

For example, the first camera 22 in the disposition example 7 is disposed below the line-of-sight guiding section In0 (lower side of the paper surface) and on the axis L3. The illumination 13 is a rectangular illumination, and is disposed below the line-of-sight guiding section In0 (lower side of the paper surface) and on the axis L3 so as to surround the first camera 22.

Thereby, the first camera 22 according to Embodiment 3 can suppress the reception of specularly reflected invisible light (near-infrared light with a wavelength of 940 nm) emitted by the illumination 13. In other words, even when the user is wearing glasses, the biometric authentication system 300 can further effectively suppress the reflection of invisible light illumination due to the light reception of the specularly reflected light which is specularly reflected by the glasses (region WT2, see FIG. 9). Therefore, the biometric authentication system 300 can calculate the feature quantity of the eyes of the user required for biometric authentication processing from the first captured image.

Next, with reference to FIG. 15, a disposition example of the first camera 52, the second cameras 62, 72, and 80, the illumination 13, and the line-of-sight guiding section In0 in the biometric authentication system 300 according to Embodiment 3 will be described. FIG. 15 is a diagram illustrating respective disposition examples of the cameras (specifically, the first camera 52 and the second cameras 62, 72, and 80, respectively), the illumination 13, and the line-of-sight guiding section In0 when there are two cameras. In addition, the biometric authentication system 300 shown in FIG. 15 shows an example in which the first camera 52, the second cameras 62, 72, and 80, the illumination 13, and the line-of-sight guiding section In0 are integrally configured, but some or all may be configured separately.

The first camera 52 or the second cameras 62, 72, and 80, and the illumination 13 are disposed at positions that are mutually asymmetric with respect to the line-of-sight guiding section In0, which is the line-of-sight position of the user. More specifically, each of the first camera 52 and the second cameras 62 and 72 is disposed at a position that is symmetric with respect to the illumination 13 that emits invisible light. Further, when the line-of-sight guiding section In0 is a visible light illumination, the second camera 80 is disposed at a position that is mutually asymmetric with respect to the line-of-sight guiding section In0 that emits visible light. In addition, the disposition examples 1 to 4 of the first camera 52, the second cameras 62, 72, and 80, the illumination 13, and the line-of-sight guiding section In0 will be described below, but the disposition examples 1 to 4 shown in FIG. 15 are examples, and it is needless to say that the disposition examples are not limited thereto. Also, the illumination 13 may be a surface light source or a point light source.

For example, the first camera 52, the second cameras 62, 72, and 80, the illumination 13, and the line-of-sight guiding section In0 in the disposition example 1 are each disposed on a straight line (axis L4). The first camera 52 is disposed on the left side of the line-of-sight guiding section In0 (left side of the paper surface). The second cameras 62, 72, and 80 are disposed on the right side of the line-of-sight guiding section In0 (right side of the paper surface). The illumination 13 is disposed on the right side of the second cameras 62, 72, and 80 (right side of the paper surface). Here, the first camera 52 and the second cameras 62, 72, and 80 are disposed at positions that are line-symmetric to each other with respect to the axis L3.

For example, the first camera 52, the second cameras 62, 72, and 80, the illumination 13, and the line-of-sight guiding section In0 in the disposition example 2 are each disposed on a straight line (axis L4). Each of the first camera 52, the second cameras 62, 72, and 80, and the illumination 13 is disposed on the left side of the line-of-sight guiding section In0 (left side of the paper surface).

In addition, the disposition examples 1 and 2 describe an example in which the first camera 52, the second cameras 62, 72, and 80, the illumination 13, and the line-of-sight guiding section In0 are each disposed on a straight line (axis L4), but each may be disposed on the axis L3 under similar conditions.

For example, the illumination 13 in the disposition example 3 is disposed on the right side of the line-of-sight guiding section In0 (right side of the paper surface) and on the axis L4. The first camera 52 is disposed above the line-of-sight guiding section In0 (upper side of the paper surface) and on the axis L4. The second cameras 62, 72, and 80 are disposed above the illumination 13 (upper side of the paper surface), to the right side of the first camera 52 (right side of the paper surface), and at positions adjacent to each of the illumination 13 and the first camera 52.

For example, the first camera 52, the second cameras 62, 72, and 80, and the illumination 13 in the disposition example 4 are each disposed side by side in the direction along the axis L3 on the right side of the line-of-sight guiding section In0 (right side of the paper surface). The illumination 13 is disposed at the lower right (at the lower right on the paper surface) of the line-of-sight guiding section In0. The first camera 52 and the second cameras 62, 72, and 80 are each disposed side by side along the axis L3 above the illumination 13 (upper side of the paper surface).

Thereby, the first camera 52 according to Embodiment 3 can suppress the reception of specularly reflected visible light (near-infrared light with a wavelength of 940 nm) emitted by the illumination 13. In other words, even when the user is wearing glasses, the biometric authentication system 300 can further effectively suppress the reflection of invisible light illumination due to the light reception of the specularly reflected light which is specularly reflected by the glasses (region WT2, see FIG. 9). Therefore, the biometric authentication system 300 can calculate the feature quantity of the eyes of the user required for biometric authentication processing from the first captured image.

Next, with reference to FIG. 16, respective disposition examples of the first camera 22, the two illuminations 13A and 13B, and the line-of-sight guiding section In0 in the biometric authentication system 300 according to Embodiment 3 will be described. FIG. 16 is a diagram illustrating respective disposition examples of the camera (specifically, the first camera 22), the illuminations 13A and 13B, and the line-of-sight guiding section In0 when there are two illuminations. In addition, the biometric authentication system 300 shown in FIG. 16 shows an example in which the first camera 22, the illuminations 13A and 13B, and the line-of-sight guiding section In0 are integrally configured, but some or all may be configured separately. In addition, in the description of FIG. 16, in order to make the description easier to understand, one illumination 13 is given the code "13A" and the other illumination 13 is given the code "13B" to describe the disposition of each of the two illuminations 13.

The first camera 22, and the illuminations 13A and 13B are disposed at positions that are mutually asymmetric with respect to the line-of-sight guiding section In0, which is the line-of-sight position of the user. More specifically, the first camera 22 is disposed at a position that is mutually asymmetric with respect to the illuminations 13A and 13B that emit invisible light. In addition, the disposition examples 1 to 4 of the first camera 22, the illuminations 13A and 13B, and the line-of-sight guiding section In0 will be described below, but the disposition examples 1 to 4 shown in FIG. 16 are examples, and it is needless to say that the disposition examples are not limited thereto. Also, the illuminations 13A and 13B may be surface light sources or point light sources.

For example, the first camera 22 and the illuminations 13A and 13B in the disposition example 1 are disposed on a straight line (axis L4). The first camera 22 is disposed on the right side of the line-of-sight guiding section In0 (right side of the paper surface). The illuminations 13A and 13B are each disposed at the same distance from the axis L3 on the right side (the right side of the paper surface) and the left side (the left side of the paper surface) of the line-of-sight guiding section In0. Here, the illuminations 13A and 13B are each disposed at positions farther than a distance D31 from the axis L3.

For example, the first camera 22 and the illuminations 13A and 13B in the disposition example 2 are disposed on a straight line (axis L4). The illuminations 13A and 13B, and the first camera 22 are each disposed on the left side of the line-of-sight guiding section In0 (left side of the paper surface).

In addition, the disposition examples 1 and 2 describe an example in which the first camera 52, the second cameras 62, 72, and 80, the illumination 13, and the line-of-sight guiding section In0 are each disposed on a straight line (axis L4), but each may be disposed on the axis L3 under similar conditions.

For example, the first camera 22 in the disposition example 3 is disposed on the right side of the line-of-sight guiding section In0 (right side of the paper surface) and on the axis L4. The illumination 13A is disposed above the line-of-sight guiding section In0 (upper side of the paper surface) and on the axis L4. In addition, the illumination 13B is disposed above the first camera 22 (upper side of the paper surface), to the right side of the illumination 13A (right side of the paper surface), and at positions adjacent to each of the illumination 13A and the first camera 22.

For example, the first camera 22, and the illuminations 13A and 13B in the disposition example 4 are each disposed side by side in the direction along the axis L3 on the right side of the line-of-sight guiding section In0 (right side of the paper surface). The first camera 22 is disposed on the right side (the right side of the paper surface) of the line-of-sight guiding section In0 and on the axis L4. The illuminations 13A and 13B are disposed at positions that are line-symmetric with respect to the axis L3 with the first camera 22 disposed on the axis L4 interposed therebetween.

Thereby, the first camera 22 according to Embodiment 3 can suppress the reception of specularly reflected invisible light (near-infrared light with a wavelength of 940 nm) respectively emitted by the illuminations 13A and 13B. In other words, even when the user is wearing glasses, the biometric authentication system 300 can further effectively suppress the reflection of invisible light illumination due to the light reception of the specularly reflected light which is specularly reflected by the glasses (region WT2, see FIG. 9). Therefore, the biometric authentication system 300 can calculate the feature quantity of the eyes of the user required for biometric authentication processing from the first captured image.

Figure 17:
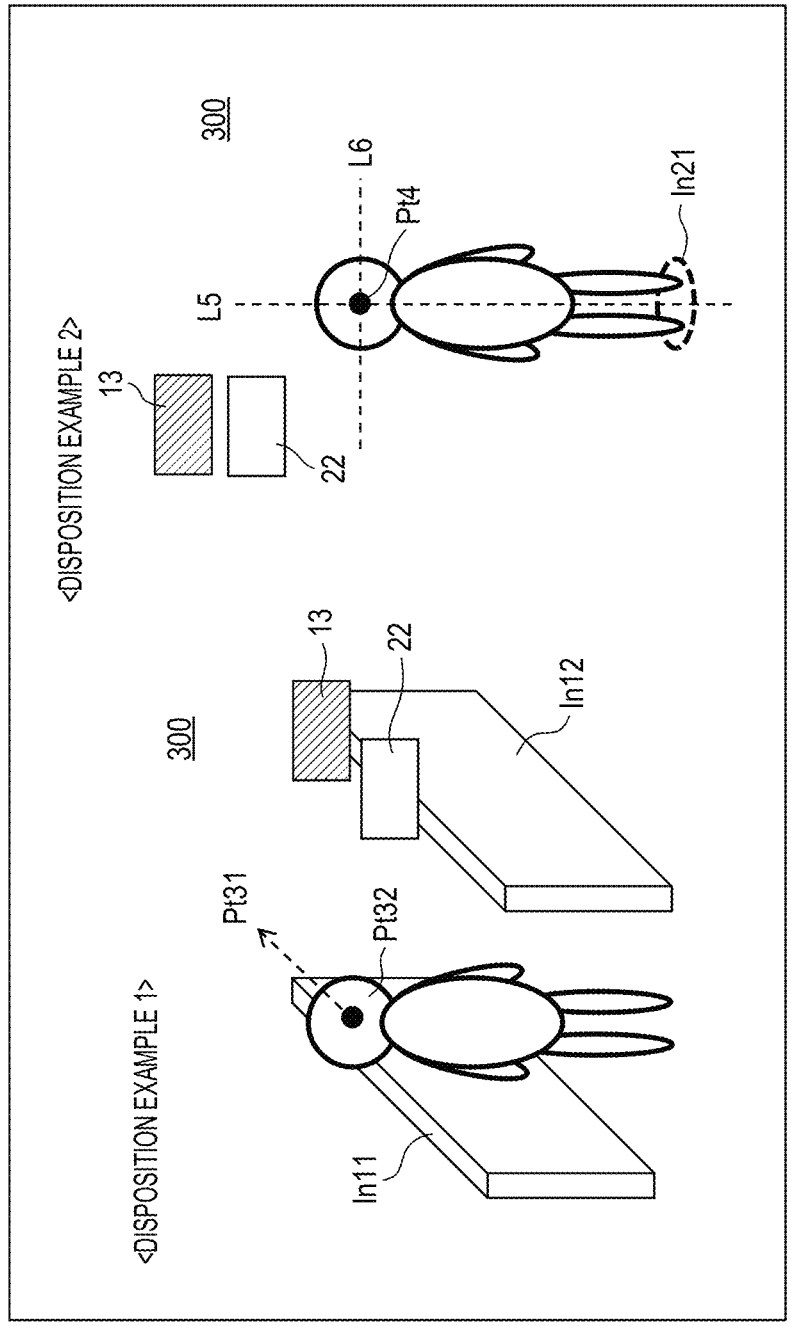
FIG. 17 is a diagram illustrating an example of line-of-sight guide and respective disposition examples of a camera and an illumination.

Next, with reference to FIG. 17, a disposition example of the first camera 22, the illumination 13, and the line-of-sight guiding sections In11, In12, and In21 in the biometric authentication system 300 according to Embodiment 3 will be described. FIG. 17 is a diagram illustrating an example of line-of-sight guide, and respective disposition examples of the camera (specifically, the first camera 22) and the illumination 13.

For example, each of the line-of-sight guiding sections In11 and In12 in disposition example 1 forms a movement line of the user along the extending direction of each of the line-of-sight guiding sections In11 and In12. A line-of-sight direction Pt3 of the user passing between the line-of-sight guiding sections In11 and In12 is a direction along the respective extending directions of the line-of-sight guiding sections In11 and In12. In other words, the user's line-of-sight direction is guided by the line-of-sight guiding sections In11 and In12 in a direction along the respective extending directions of the line-of-sight guiding sections In11 and In12.

When such line-of-sight guiding sections In11 and In12 are provided respectively, the first camera 22 and the illumination 13 are disposed above the line-of-sight guiding section In12 and in front of the user in the traveling direction. In addition, the first camera 22 and the illumination 13 are disposed at positions that are mutually asymmetric with respect to a line-of-sight position Pt32 of the user obtained by projecting a midpoint of a line segment connecting the right eye and the left eye of the user on a horizontal plane orthogonal to the respective extending directions of the line-of-sight guiding sections In11 and In12 (that is, line-of-sight direction Pt3).

For example, the line-of-sight guiding section In21 in the disposition example 2 is a circular mark provided on the floor surface, and indicates the standing position of the user. A line-of-sight position Pt4 of the user standing upright on the line-of-sight guiding section In21 is guided to the central portion of the line-of-sight guiding section In21 in a direction perpendicular to the floor surface on which the line-of-sight guiding section In21 is provided.

When such the line-of-sight guiding section In21 is provided, the first camera 22 and the illumination 13 are disposed at positions that mutually asymmetric with respect to the line-of-sight position Pt4 of the user, respectively. The first camera 22 and the illumination 13 shown in FIG. 17 are disposed on the front side of the user's face, at a position higher than a horizontal axis L6 corresponding to the height of the user's line-of-sight position Pt4, and on the left side of a vertical axis L5 perpendicular to the standing position (floor surface) indicated by the line-of-sight guiding section In21 (left side of the paper surface).

Here, the user's line-of-sight position Pt4 depends on the user's own height. Therefore, the first camera 22 and the illumination 13 may be provided at a position higher or lower than the possible line-of-sight height of the user (that is, height of eye indicated by the horizontal axis L6).

In addition, the user's standing position guided by the line-of-sight guiding section In21 may differ depending on the user. Therefore, the first camera 22 and the illumination 13 are located within the region indicated by the line-of-sight guiding section In21, and may be disposed biased to either one side of the right side or the left side with respect to the standing position to which the user can be guided (that is, the position of the midpoint of a line segment connecting the right eye and the left eye indicated by the vertical axis L5).

As a result, in the biometric authentication system 300 according to Embodiment 3, even when the line-of-sight position changes for each user based on the height of the user, the standing position of the user, and the like, the first camera 22 and the illumination 13 can be disposed at positions that are mutually asymmetric with respect to the line-of-sight positions of the user that can be guided by the line-of-sight guiding sections Int1, In12, and In21. Therefore, the first camera 22 can suppress the reception of specularly reflected invisible light (near-infrared light with a wavelength of 940 nm) that is emitted by the illumination 13. In other words, even when the user is wearing glasses, the biometric authentication system 300 can further effectively suppress the reflection of invisible light illumination due to the light reception of the specularly reflected light which is specularly reflected by the glasses (region WT2, see FIG. 9). Therefore, the biometric authentication system 300 can calculate the feature quantity of the eyes of the user required for biometric authentication processing from the first captured image.

Figure 18:
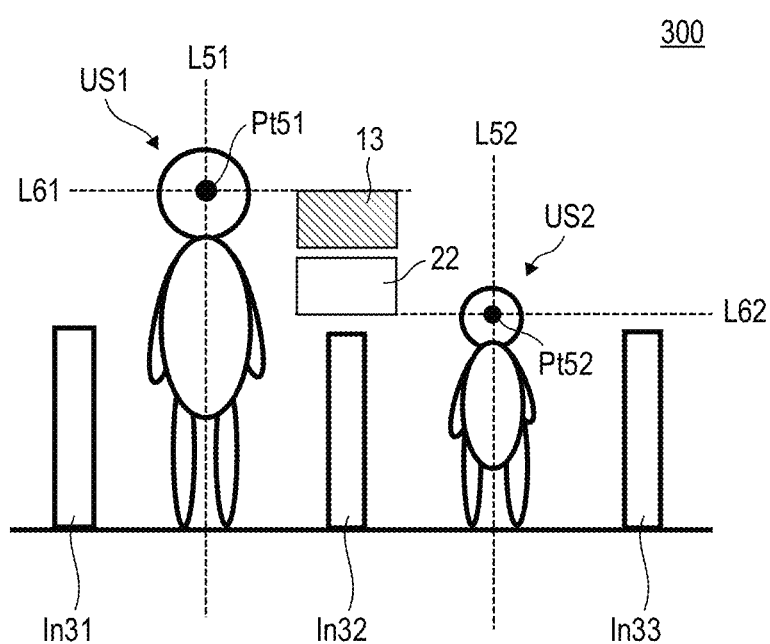
FIG. 18 is a diagram illustrating an example of line-of-sight guide and respective disposition examples of a camera and an illumination.

Next, with reference to FIG. 18, a disposition example of the first camera 22, the illumination 13, and the line-of-sight guiding sections In31 to In33 in the biometric authentication system 300 according to Embodiment 3 will be described. FIG. 18 is a diagram illustrating an example of line-of-sight guide, and respective disposition examples of the camera (specifically, the first camera 22) and the illumination 13.

For example, each of the line-of-sight guiding sections In31 to In33 shown in FIG. 18 forms the user's movement line or standing position between the line-of-sight guiding section In31 and the line-of-sight guiding section In32 and between the line-of-sight guiding section In32 and the line-of-sight guiding section In33. In such a case, the user is guided between the line-of-sight guiding section In31 and the line-of-sight guiding section In32, or between the line-of-sight guiding section In32 and the line-of-sight guiding section In33.

When each of such the line-of-sight guiding sections In31 to In33 is provided, the first camera 22 and the illumination 13 are located in front of the faces of users US1 and US2, respectively, and provided between a horizontal axis L61 indicating the height of the eye of the user US1 having the maximum height (that is, the line-of-sight position Pt51) who can be a biometric authentication target by the biometric authentication system 300 and a horizontal axis L62 indicating the height of the eye of the user US2 having the minimum height (that is, the line-of-sight position pt52) who can be a biometric authentication target by the biometric authentication system 300, and between a vertical axis L51 and a vertical axis L52 indicating respective standing positions of the users US1 and US2 who are respectively guided between the line-of-sight guiding section In31 and the line-of-sight guiding section In32 and between the line-of-sight guiding section In32 and the line-of-sight guiding section In33.

As a result, in the biometric authentication system 300 according to Embodiment 3, even when the line-of-sight position changes for each user based on the height of the user, the standing position of the user, and the like, the first camera 22 and the illumination 13 can be disposed at positions that are mutually asymmetric with respect to the line-of-sight positions Pt51 and Pt52 of the user that can be guided by the line-of-sight guiding sections In31 to In33. Therefore, the first camera 22 can suppress the reception of specularly reflected invisible light (near-infrared light with a wavelength of 940 nm) that is emitted by the illumination 13. In other words, even when the user is wearing glasses, the biometric authentication system 300 can further effectively suppress the reflection of invisible light illumination due to the light reception of the specularly reflected light which is specularly reflected by the glasses (region WT2, see FIG. 9). Therefore, the biometric authentication system 300 can calculate the feature quantity of the eyes of the user required for biometric authentication processing from the first captured image.

As described above, the biometric authentication system 300 (an example of an authentication system) according to Embodiment 3 includes at least one illumination 13 that irradiates a user (an example of a person to be authenticated) with invisible light, the first imaging devices C1 and C21 that capture images of the user irradiated with the invisible light, the authentication devices P1 and P1A that are capable of communicating with the first imaging devices C1 and C21 and execute authentication of the user based on the first invisible light image captured by the first imaging devices C1 and C21 (an example of the first invisible light image), and the line-of-sight guiding sections In0, In11, In12, In21, In31, In32, and In33 that guide the line-of-sight position of the user. The illumination 13 and the first imaging devices C1 and C21 are disposition at positions that are respectively asymmetric with respect to the line-of-sight position (for example, the position of the line-of-sight guiding section In0 equal to the line-of-sight position, and the line-of-sight positions Pt32, Pt4, Pt51, Pt52, and the like) of the person to be authenticated guided by the line-of-sight guiding sections In0, In11, In12, In21, In31, In32, and In33.

Thereby, the biometric authentication system 300 according to Embodiment 3 can suppress the reception of specularly reflected invisible light (near-infrared light with a wavelength of 940 nm) emitted by the illumination 13. In other words, even when the user is wearing glasses, the biometric authentication system 300 can more effectively suppress the reflection (region WT2, see FIG. 9) of invisible light illumination due to the light reception of the specularly reflected light which is reflected by the glasses, and acquire the first captured image suitable (that is, the feature quantity of the user used for biometric authentication can be calculated) for biometric authentication.

Also, the line-of-sight guiding section In0 in the biometric authentication system 300 according to Embodiment 3 is provided in an illumination or the first imaging device. As a result, the biometric authentication system 300 according to Embodiment 3 can respectively dispose the illumination 13 and the first imaging devices C1 and C21 at positions that are respectively asymmetric with respect to the line-of-sight guiding section In0 by guiding the user's line-of-sight position to the line-of-sight guiding section In0.

Also, the line-of-sight guiding section In0 in the biometric authentication system 300 according to Embodiment 3 is a mark that can be visually recognized by the user. As a result, the biometric authentication system 300 according to Embodiment 3 can respectively dispose the illumination 13 and the first imaging devices C1 and C21 at positions that are respectively asymmetric with respect to the line-of-sight guiding section In0 by guiding the user's line-of-sight position to the line-of-sight guiding section In0 that is visually recognizable.

In addition, the line-of-sight guiding sections In1, In12, In31, In32, and In33 in the biometric authentication system 300 according to Embodiment 3 guide the user in a predetermined direction (for example, the line-of-sight direction Pt31 shown in FIG. 17). As a result, the biometric authentication system 300 according to Embodiment 3 can guide the user's line-of-sight direction in a predetermined direction by guiding the user in a predetermined direction and respectively dispose the illumination 13 and the first imaging devices C1 and C21 at positions that are respectively asymmetric with respect to the line-of-sight guiding sections Int1, In12, In31, In32, and In33.

In addition, the line-of-sight guiding sections In21, In31, In32, and In33 in the biometric authentication system 300 according to Embodiment 3 guide the user to a position at which authentication is performed. As a result, the biometric authentication system 300 according to Embodiment 3 can guide the user's line-of-sight position to a position that is respectively asymmetric with respect to the respective illumination 13 and the first imaging devices C1 and C21 by guiding the user to be authenticated.

Also, the invisible light in the biometric authentication system 300 according to Embodiment 3 is near-infrared light with a wavelength of 940 nm. As a result, the biometric authentication system 300 according to Embodiment 3 can acquire the first captured image from which a feature quantity of a user used for biometric authentication can be calculated when imaging outdoors or even when the user's face is in a backlit state by capturing the first captured image at a wavelength of 940 nm having a large attenuation amount of energy of sunlight due to moisture in air.

Also, the illumination 13 in the biometric authentication system 300 according to Embodiment 3 polarizes invisible light in the first direction by the first polarizing plate 14 and irradiates the invisible light. The first imaging devices C1 and C21 receive invisible light polarized in a second direction substantially orthogonal to the first direction by the second polarizing plates 20 and 50 to image the user. As a result, the biometric authentication system 300 according to Embodiment 3 can more effectively suppress the reflection of the invisible light illumination on the first captured image such as the captured image IMG22 shown in FIG. 9 by polarizing the invisible light with a wavelength of 940 nm by the second polarizing plates 20 and 50. That is, the biometric authentication systems 300 can more effectively suppress the reflection of invisible light on the first captured image used for calculating the feature quantity of the biological information of a user, and can acquire the first captured image more suitable for biometric authentication (that is, the feature quantity of the user used for biometric authentication can be calculated).

As described above, various forms of embodiments have been described with reference to the accompanying drawings, but the present disclosure is not limited to such examples. It is obvious for a person skilled in the art to conceive of various modifications, alterations, replacements, additions, deletions, and equivalents within the category disclosed in the claims, and it is understood that they are also included in the technical scope of the present disclosure. Further, the constitutional elements of the various embodiments described above may be arbitrarily combined without departing from the spirit of the invention.

INDUSTRIAL APPLICABILITY

The present disclosure is useful as presentation of an authentication system and an authentication method capable of suppressing reflection of illumination light due to specular reflection and acquiring a face image more suitable for biometric authentication.

What is claimed is:

1. An authentication system, comprising:
   at least one illumination that irradiates a person to be authenticated with invisible light;
   a first imaging device that images the person to be authenticated and irradiated with the invisible light;
   an authentication device that is capable of communicating with the first imaging device, and executes authentication of the person to be authenticated based on a first invisible light image captured by the first imaging device; and
   a second imaging device that is capable of communicating with the authentication device, and receives surface-reflected light of the person to be authenticated and irradiated with the invisible light, wherein
   the illumination and the first imaging device are disposed at positions that are respectively asymmetric with respect to a line-of-sight position of the person to be authenticated, the line-of-sight position of the person to be authenticated being guided by a monitor that guides the line-of-sight position of the person to be authenticated,
   the monitor displays the first invisible light image,
   the second imaging device transmits a second captured image obtained by imaging the person to be authenticated to the authentication device,
   the authentication device outputs the second captured image to the monitor for display,
   the second captured image is a second invisible light image,
   the illumination emits the invisible light polarized in a first direction by a first polarizing plate, and
   the second imaging device polarizes the surface-reflected light that is reflected by the person to be authenticated in a second direction substantially parallel to the first direction by a second polarizing plate, and receives the polarized invisible light to image the person to be authenticated.

2. The authentication system according to claim 1, wherein
   the monitor is provided in the illumination or the first imaging device.

3. The authentication system according to claim 1, wherein
   the first imaging device receives the invisible light polarized in a third direction substantially orthogonal to the first direction by a third polarizing plate to image the person to be authenticated.

4. The authentication system according to claim 1, wherein
   the illumination and the first imaging device are disposed at the positions that are respectively asymmetric with respect to a center position of a display region for displaying the first invisible light image by the monitor.

5. The authentication system according to claim 1, wherein
   the authentication device detects a face, of the person to be authenticated, appearing in the first invisible light image, generates a first frame indicating a position of the face, of the person to be authenticated, appearing in the first invisible light image based on positional information of the detected face of the person to be authenticated on the first invisible light image, superimposes the first frame on the first invisible light image, and outputs the first invisible light image superimposed with the first frame to the monitor for display.

6. The authentication system according to claim 5, wherein
   the illumination and the first imaging device are disposed at the positions that are respectively asymmetric with respect to a center position of the first frame superimposed on the first invisible light image.

7. The authentication system according to claim 1, wherein
   when the person to be authenticated is authenticated, the authentication device executes a predetermined operation set in advance, and
   when the person to be authenticated is not authenticated, the authentication device outputs the first invisible light image to the monitor for display.

8. The authentication system according to claim 1, wherein
   the illumination, the first imaging device, and the second imaging device are disposed at positions that are respectively asymmetric with respect to a center position of a display region for displaying the second captured image by the monitor.

9. The authentication system according to claim 1, wherein
   the authentication device detects a face, of the person to be authenticated, appearing in the first invisible light image, generates a second frame indicating a position of the face, of the person to be authenticated, appearing in the second captured image based on positional information of the detected face of the person to be authenticated on the first invisible light image, superimposes the second frame on the second captured image, and outputs the second captured image superimposed with the second frame to the monitor for display.

10. The authentication system according to claim 9, wherein
    the illumination, the first imaging device, and the second imaging device are disposed at positions that are respectively asymmetric with respect to a center position of the second frame superimposed on the second captured image.

11. The authentication system according to claim 1, wherein
    the second imaging device includes a filter that transmits invisible light out of surface-reflected light that is reflected by the person to be authenticated, and receives the invisible light through the filter with an image sensor to image the person to be authenticated.

12. The authentication system according to claim 1, wherein when the person to be authenticated is authenticated, the authentication device executes a predetermined operation set in advance, and when the person to be authenticated is not authenticated, the authentication device displays the second captured image on the monitor.

13. The authentication system according to claim 1, wherein the invisible light is near-infrared light with a wavelength of 940 nm.

14. An authentication method performed by an authentication system, the authentication system including:

at least one illumination that irradiates a person to be authenticated with invisible light;

a first imaging device that images the person to be authenticated, which is irradiated with the invisible light;

an authentication device that is capable of communicating with the first imaging device, and executes authentication of the person to be authenticated based on a first invisible light image captured by the first imaging device; and a second imaging device that is capable of communicating with the authentication device, and receives surface-reflected light of the person to be authenticated and irradiated with the invisible light, wherein the illumination and the first imaging device are disposed at positions that are respectively asymmetric with respect to a line-of-sight position of the person to be authenticated, the line-of-sight position of the person to be authenticated being guided by a monitor that guides the line-of-sight position of the person to be authenticated, the authentication method comprising:

imaging, by the first imaging device, the person to be authenticated and irradiated with the invisible light;

imaging, by the second imaging device, the person to be authenticated; and authenticating, by the authentication device, the person to be authenticated based on the captured first invisible light image and the received surface-reflected light, wherein the monitor displays the first invisible light image, the second imaging device transmits a second captured image obtained by the imaging of the person to be authenticated to the authentication device, the authentication device outputs the second captured image to the monitor for display, the second captured image is a second invisible light image, the illumination emits the invisible light polarized in a first direction by a first polarizing plate, and the second imaging device polarizes the surface-reflected light that is reflected by the person to be authenticated in a second direction substantially parallel to the first direction by a second polarizing plate, and receives the polarized invisible light to image the person to be authenticated.

\* \* \* \* \*